United States Patent
Yin

(10) Patent No.: US 12,518,479 B2
(45) Date of Patent: Jan. 6, 2026

(54) THREE-DIMENSIONAL MODEL RECONSTRUCTION METHOD, DEVICE, AND STORAGE MEDIUM

(71) Applicant: Petal Cloud Technology Co., Ltd., Dongguan (CN)

(72) Inventor: Jiaxin Yin, Nanjing (CN)

(73) Assignee: PETAL CLOUD TECHNOLOGY CO., LTD., Dongguan (CN)

( * ) Notice: Subject to any disclaimer, the term of this patent is extended or adjusted under 35 U.S.C. 154(b) by 174 days.

(21) Appl. No.: 18/258,716

(22) PCT Filed: Dec. 16, 2021

(86) PCT No.: PCT/CN2021/138868
§ 371 (c)(1),
(2) Date: Jun. 21, 2023

(87) PCT Pub. No.: WO2022/135272
PCT Pub. Date: Jun. 30, 2022

(65) Prior Publication Data
US 2024/0046560 A1 Feb. 8, 2024

(30) Foreign Application Priority Data
Dec. 25, 2020 (CN) .......................... 202011585146.9

(51) Int. Cl.
*G06T 17/00* (2006.01)
*B25J 9/02* (2006.01)

(52) U.S. Cl.
CPC ................ *G06T 17/00* (2013.01); *B25J 9/02* (2013.01)

(58) Field of Classification Search
CPC .......... G06T 17/00; B25J 9/02; H04N 5/2624; H04N 23/64; H04N 5/2625; H04N 23/54; H04N 23/695
See application file for complete search history.

(56) References Cited

U.S. PATENT DOCUMENTS

| 2011/0312374 A1 | 12/2011 | Chen et al. |
| 2015/0320320 A1 | 11/2015 | Kopelman et al. |

(Continued)

FOREIGN PATENT DOCUMENTS

| CN | 102948140 A | 2/2013 |
| WO | 2020058758 A1 | 3/2020 |

OTHER PUBLICATIONS

"Photogrammetric Computer Vision Framework",[online]https://alicevision.org/, Sep. 2024, total 6 pages.

(Continued)

*Primary Examiner* — Chong Wu
(74) *Attorney, Agent, or Firm* — Conley Rose, P.C.

(57) ABSTRACT

A three-dimensional model reconstruction method includes: sending three-dimensional model reconstruction indicator information to a server device, where the three-dimensional model reconstruction indicator information is used for representing a three-dimensional model reconstruction requirement; receiving an image acquisition solution sent by the server device, where the image acquisition solution is used for guiding acquisition of a two-dimensional image of a reconstructed object; and acquiring the two-dimensional image of the reconstructed object according to the image acquisition solution, where the two-dimensional image is used for three-dimensional model reconstruction.

20 Claims, 16 Drawing Sheets

(56) References Cited

U.S. PATENT DOCUMENTS

| | | |
|---|---|---|
| 2017/0251143 A1 | 8/2017 | Peruch et al. |
| 2018/0144547 A1* | 5/2018 | Shakib ................ G06T 15/503 |
| 2022/0049953 A1* | 2/2022 | Sharapov ............. G01B 11/002 |

OTHER PUBLICATIONS

Yi-Chin wu et al., "Tangible and Visible 3D Object Reconstruction in Augmented Reality." 978-1-7281-4765-9/19/$31.00 © 2019 IEEE. Oct. 14-18, 2019, total 11 pages.

* cited by examiner

THREE-DIMENSIONAL MODEL RECONSTRUCTION METHOD, DEVICE, AND STORAGE MEDIUM

CROSS-REFERENCE TO RELATED APPLICATIONS

This is a U.S. National Stage of International Patent Application No. PCT/CN2021/138868 filed on Dec. 16, 2021, which claims priority to Chinese Patent Application No. 202011585146.9 filed on Dec. 25, 2020. Both of the aforementioned applications are hereby incorporated by reference in their entireties.

TECHNICAL FIELD

This application relates to the field of computer technologies, and in particular, to a three-dimensional model reconstruction method, a device, and a storage medium.

BACKGROUND

Three-dimensional (Three-Dimensional, 3D) model reconstruction refers to a process of establishing a mathematical model suitable for computer identification and processing based on a single-view or multi-view image, is a key technology for establishing and expressing an objective world in a computer, and can be widely used in scenarios such as reverse engineering, games, shopping, and teaching.

A 3D model reconstruction method in a related technology mainly includes the following steps: Step S101; Acquire, by using an image acquisition device, a two-dimensional image of a reconstructed object from different angles and different distances, where the reconstructed object is fixed in an image acquisition process, and only the image acquisition device is moved. Step S102: Perform processing such as feature extraction, image matching, feature matching, three-dimensional structure, depth of field estimation, meshing, texture addition, and positioning on the acquired two-dimensional image to obtain a 3D model corresponding to the reconstructed object.

However, in step S102, a process of generating the 3D model based on the two-dimensional image is very time-consuming. If a reconstructed 3D model does not meet a quality requirement of a user, 3D model reconstruction needs to be performed again. Time of the user is wasted and user experience is poor.

SUMMARY

In view of this, this application provides a three-dimensional model reconstruction method, a device, and a storage medium, to resolve a problem of a waste of time of a user and poor user experience in a 3D model reconstruction solution in the conventional technology.

According to a first aspect, an embodiment of this application provides a three-dimensional model reconstruction method. The method includes: sending three-dimensional model reconstruction indicator information to a server device, where the three-dimensional model reconstruction indicator information is used for representing a three-dimensional model reconstruction requirement; receiving an image acquisition solution sent by the server device, where the image acquisition solution is used for guiding acquisition of a two-dimensional image of a reconstructed object; and acquiring the two-dimensional image of the reconstructed object according to the image acquisition solution, where the two-dimensional image is used for three-dimensional model reconstruction.

In this embodiment of this application, by adding a reconstruction communication link in a 3D model reconstruction process for communication about a 3D model reconstruction requirement and an image acquisition solution, a problem of a 3D model reconstruction failure caused by that an acquired two-dimensional image does not meet the 3D model reconstruction requirement is avoided, thereby improving a one-time reconstruction success rate.

In a possible implementation, the image acquisition solution includes an image acquisition guide program; and the acquiring the two-dimensional image of the reconstructed object according to the image acquisition solution includes: acquiring the two-dimensional image of the reconstructed object based on guidance of the image acquisition guide program.

In this embodiment of this application, the image acquisition guide program is configured to guide acquisition of the two-dimensional image, thereby improving convenience and accuracy of the acquisition of the two-dimensional image.

In a possible implementation, the acquiring the two-dimensional image of the reconstructed object based on guidance of the image acquisition guide program includes: outputting movement direction guidance information, where the movement direction guidance information is used for prompting to move to a target location; and acquiring the two-dimensional image of the reconstructed object in response to an image acquisition instruction input by a user.

In this embodiment of this application, the movement direction guidance information is used for guiding a terminal device to move to the target location, thereby facilitating a user operation and improving man-machine interaction friendliness.

In a possible implementation, the image acquisition guide program includes an image acquisition sequence, and the outputting movement direction guidance information includes: outputting, based on the image acquisition sequence, guidance information of a movement direction from a first acquisition location to a second acquisition location after acquisition for a first two-dimensional image at the first acquisition location is completed, where the guidance information of the movement direction from the first acquisition location to the second acquisition location is used for prompting to move to the second acquisition location.

In this embodiment of this application, it is convenient for a user to sequentially complete acquisition of all two-dimensional images in a preset image acquisition sequence, thereby improving acquisition efficiency of the two-dimensional image, and avoiding omission of the two-dimensional image.

In a possible implementation, the method further includes: outputting prompt information about reaching the target location when it is determined that the terminal device moves to the target location.

In this embodiment of this application, when the terminal device moves to the target location, prompt information of reaching the target location is output, to prevent the user from triggering an image acquisition action of the terminal device when the user does not reach the target location or exceeds the target location, thereby affecting quality of the acquired two-dimensional image.

In a possible implementation, the acquiring the two-dimensional image of the reconstructed object based on guidance of the image acquisition guide program includes: controlling, through the image acquisition guide program, a mechanical arm to drive the terminal device to move to a target location, and acquiring the two-dimensional image of the reconstructed object.

In this embodiment of this application, more accurate control can be performed on the acquisition of the two-dimensional image through the mechanical arm, and precision of the acquisition of the two-dimensional image is higher.

In a possible implementation, the method further includes: displaying a preview image of the acquired two-dimensional image.

In this embodiment of this application, a preview image of the acquired two-dimensional image is displayed, so that the user can learn of an acquisition progress of the two-dimensional image in real time. In addition, the user may further check based on the preview image, to avoid omission of the two-dimensional image.

In a possible implementation, the method further includes: preprocessing an acquired two-dimensional image to obtain summary information of the two-dimensional image; sending the summary information of the two-dimensional image to the server device, where the summary information is used for determining whether the acquired two-dimensional image meets the three-dimensional model reconstruction requirement; and acquiring, in response to a supplementary image acquisition solution sent by the server device, the two-dimensional image of the reconstructed object in a supplementary manner based on the supplementary image acquisition solution; or receiving an instruction sent by the server device and indicating that the two-dimensional image meets a condition, where instruction indicating that the two-dimensional image meets a condition is used for representing that the acquired two-dimensional image is capable of meeting the three-dimensional model reconstruction requirement.

In this embodiment of this application, after the two-dimensional image is acquired according to the image acquisition solution, the terminal device and the server device further communicate with each other about a quantity and quality of the acquired two-dimensional images, so that a one-time reconstruction success rate can be further improved.

In a possible implementation, the supplementary image acquisition solution includes defect prompt information, where the defect prompt information is used for prompting a cause of a defect.

In this embodiment of this application, the user may determine, based on the defect prompt information, the cause of the defect, to facilitate supplement acquisition of the two-dimensional image.

In a possible implementation, the sending three-dimensional model reconstruction indicator information to a server device includes: sending the three-dimensional model reconstruction indicator information to the server device in response to three-dimensional model reconstruction indicator input information and/or three-dimensional model reconstruction indicator selection information input by a user, where the three-dimensional model reconstruction indicator information corresponds to the three-dimensional model reconstruction indicator input information and/or the three-dimensional model reconstruction indicator selection information.

In this embodiment of this application, a three-dimensional model reconstruction indicator is determined based on indicator information entered by the user, to meet a personalized requirement of the user for 3D model reconstruction.

In a possible implementation, the three-dimensional model reconstruction indicator information includes quality indicator information and/or object indicator information, where the quality indicator information is used for representing quality of a to-be-reconstructed three-dimensional model, and the object indicator information is used for representing a size of the to-be-reconstructed three-dimensional model.

In this embodiment of this application, the quality indicator information and/or the object indicator information are/is used as the three-dimensional model reconstruction indicator, to meet a personalized requirement of the user for quality and/or a size of a reconstructed three-dimensional model.

In a possible implementation, the quality indicator information includes a mean square error MSE and/or an intersection over union IoU of the to-be-reconstructed three-dimensional model; and/or the object indicator information includes a length, a width, and a height of the to-be-reconstructed three-dimensional model and/or a diameter of a sphere corresponding to the to-be-reconstructed three-dimensional model.

In a possible implementation, the three-dimensional model reconstruction indicator information further includes performance indicator information, and the performance indicator information is used for representing a resource that a user expects to be consumed in a three-dimensional model reconstruction process.

In this embodiment of this application, the user communicates a resource expected to be consumed to the server device through the performance indicator information, for example, a time resource and/or a computing resource, so that the server device performs a 3D model reconstruction operation within a resource range expected to be consumed by the user, to meet a personalized requirement of the user for a consumed resource.

In a possible implementation, the method further includes: receiving an instruction sent by the server device and indicating that a performance indicator cannot meet the three-dimensional model reconstruction requirement, where the instruction indicating that the performance indicator cannot meet the three-dimensional model reconstruction requirement is used for representing that a resource that a user expects to be consumed does not meet the three-dimensional model reconstruction requirement.

In this embodiment of this application, when determining that resources expected to be consumed by the user cannot meet the three-dimensional model reconstruction requirement, the server device sends the information to the terminal device, so that the user adjusts the three-dimensional model reconstruction indicator information, thereby avoiding a 3D model reconstruction failure.

In a possible implementation, the method further includes: receiving estimated performance information sent by the server device, where the estimated performance information includes an estimated to-be-consumed resource in a three-dimensional model reconstruction process.

In this embodiment of this application, the server device estimates a to-be-consumed resource in a three-dimensional model reconstruction process, for example, a time resource and/or a computing resource, and sends estimated resource consumption information to the terminal device, so that the user determines whether a resource consumption requirement can be met.

In a possible implementation, the image acquisition solution includes text-type image acquisition guide information and/or audio and video image acquisition guide information.

In this embodiment of this application, two-dimensional image acquisition guide is performed through the text-type image acquisition guide information and/or the audio and video image acquisition guide information, which is easy to implement, and is applicable to a relatively simple two-dimensional image acquisition scenario.

According to a second aspect, an embodiment of this application provides a terminal device, including: one or more cameras; one or more processors; a memory; and one or more computer programs, where the one or more computer programs are stored in the memory, the one or more computer programs include instructions, and when the instructions are executed by the one or more processors, the terminal device is enabled to perform the method according to any possible implementation of the first aspect.

According to a third aspect, an embodiment of this application provides a computer-readable storage medium, where the computer-readable storage medium includes a stored program, and when the program runs, a device in which the computer-readable storage medium is located is controlled to perform the method according to any possible implementation of the first aspect.

BRIEF DESCRIPTION OF DRAWINGS

To describe technical solutions in embodiments of this application more clearly, the following briefly describes the accompanying drawings for embodiments. It is clear that the accompanying drawings in the following descriptions show merely some embodiments of this application, and a person of ordinary skill in the art may derive other drawings from these accompanying drawings without creative efforts.

DESCRIPTION OF EMBODIMENTS

Figure 1:
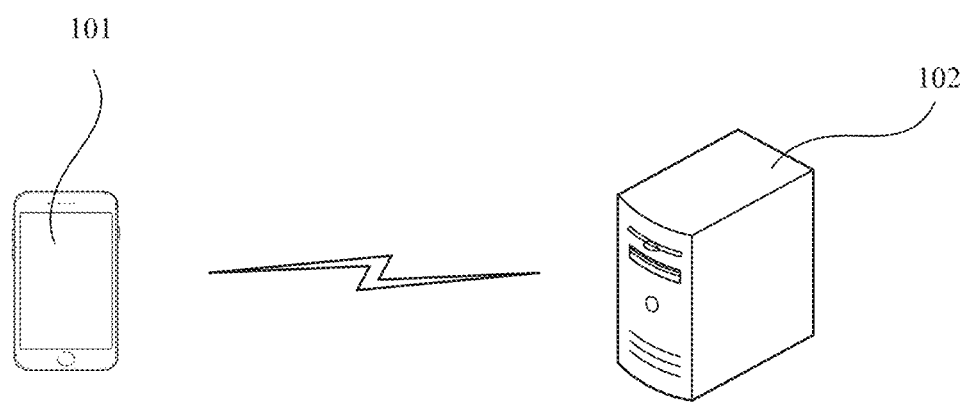
FIG. 1 is a schematic diagram of an application scenario according to an embodiment of this application.

To better understand technical solutions of this application, the following describes embodiments of this application in detail with reference to the accompanying drawings.

It should be noted that described embodiments are merely some rather than all of embodiments of this application. All other embodiments obtained by a person of ordinary skill in the art based on embodiments of this application without creative efforts shall fall within the protection scope of this application.

The terms used in the embodiments of this application are merely for the purpose of illustrating specific embodiments, and are not intended to limit this application. The terms "a" and "the" of singular forms used in embodiments of this application and the appended claims of this application are also intended to include plural forms, unless otherwise specified in the context clearly.

It should be understood that the term "and/or" used in this specification describes only an association relationship between associated objects and represents that three relationships may exist. For example, A and/or B may represent the following three cases: Only A exists, both A and B exist, and only B exists. In addition, the character "/" in this specification generally indicates an "or" relationship between the associated objects.

Before embodiments of this application are described in detail, concepts in this application are briefly described first.

A reconstructed object in embodiments of this application is a three-dimensional object on which 3D model reconstruction is to be performed by a user, and a 3D model generated through the 3D model reconstruction is a 3D model corresponding to the reconstructed object.

A photo in embodiments of this application is a photo of a reconstructed object. In some embodiments, the photo may also be described as an image, a picture, or the like.

Information exchange between hardware devices in embodiments of this application may also be understood as information exchange between software tools carried on the hardware devices. For example, information exchange between a terminal device and a server device may be understood as information exchange between an integrated development environment (Integrated development environment, IDE) on the terminal device and a cloud computing environment (AR Cloud) on the server device. The IDE is configured to provide application programs of a program development environment, including tools such as a code editor, a compiler, a debugger, and a graphical user interface. In 3D model reconstruction, the IDE is configured to upload a photo, view an execution progress, preview a 3D model, and the like. The AR Cloud is a continuous combination of point cloud maps and real-world coordinates, and creates a real-time updated 3D digital world model by scanning the real world. During 3D model reconstruction, the AR Cloud is configured to perform a 3D model reconstruction calculation process. For example, photogrammetry pipeline calculation is performed on an image uploaded through the IDE to generate a 3D model. The photogrammetry pipeline is a tool for creating a 3D model using a photographed image.

FIG. 1 is a schematic diagram of an application scenario according to an embodiment of this application. As shown in FIG. 1, an electronic device in this embodiment of this application includes a terminal device 101 and a server device 102. The terminal device 101 and the server device 102 are interconnected through a wired or wireless communication network, to perform information transmission. The communication network may be a local area network, or may be a wide area network implementing transferring by using a relay (relay) device. When the communication network is a local area network, the communication network may be, for example, a short-range communication network, such as a Wi-Fi hotspot network, a Wi-Fi P2P network, a Bluetooth network, a ZigBee network, or a near field communication (near field communication, NFC) network. When the communication network is a wide area network, the communication network may be, for example, a $3^{rd}$ generation wireless telephone technology ($3^{rd}$ generation wireless telephone technology, 3G) network, a $4^{th}$ generation mobile communication technology ($4^{th}$ generation mobile communication technology, 4G) network, a $5^{th}$ generation mobile communication technology ($5^{th}$ generation mobile communication technology, 5G) network, a future evolved public land mobile network (public land mobile network, PLMN), or the Internet.

In addition to being a mobile phone, the terminal device 101 may be a tablet computer, a personal computer (personal computer, PC), a personal digital assistant (personal digital assistant, PDA), a smartwatch, a netbook, a wearable electronic device, an augmented reality (augmented reality, AR) device, a virtual reality (virtual reality, VR) device, an in-vehicle device, a robot, smart glasses, or the like.

In this embodiment of this application, the user may trigger the terminal device 101 to enter some instructions into the terminal device 101, so that the terminal device 101 performs a corresponding operation, or the terminal device 101 and the server device 102 perform corresponding information exchange. A triggering form of the instruction is not limited in this embodiment of this application. For example, the instruction may be triggered by using a device such as a touchscreen, a mouse, a keyboard, or a key.

Figure 2:
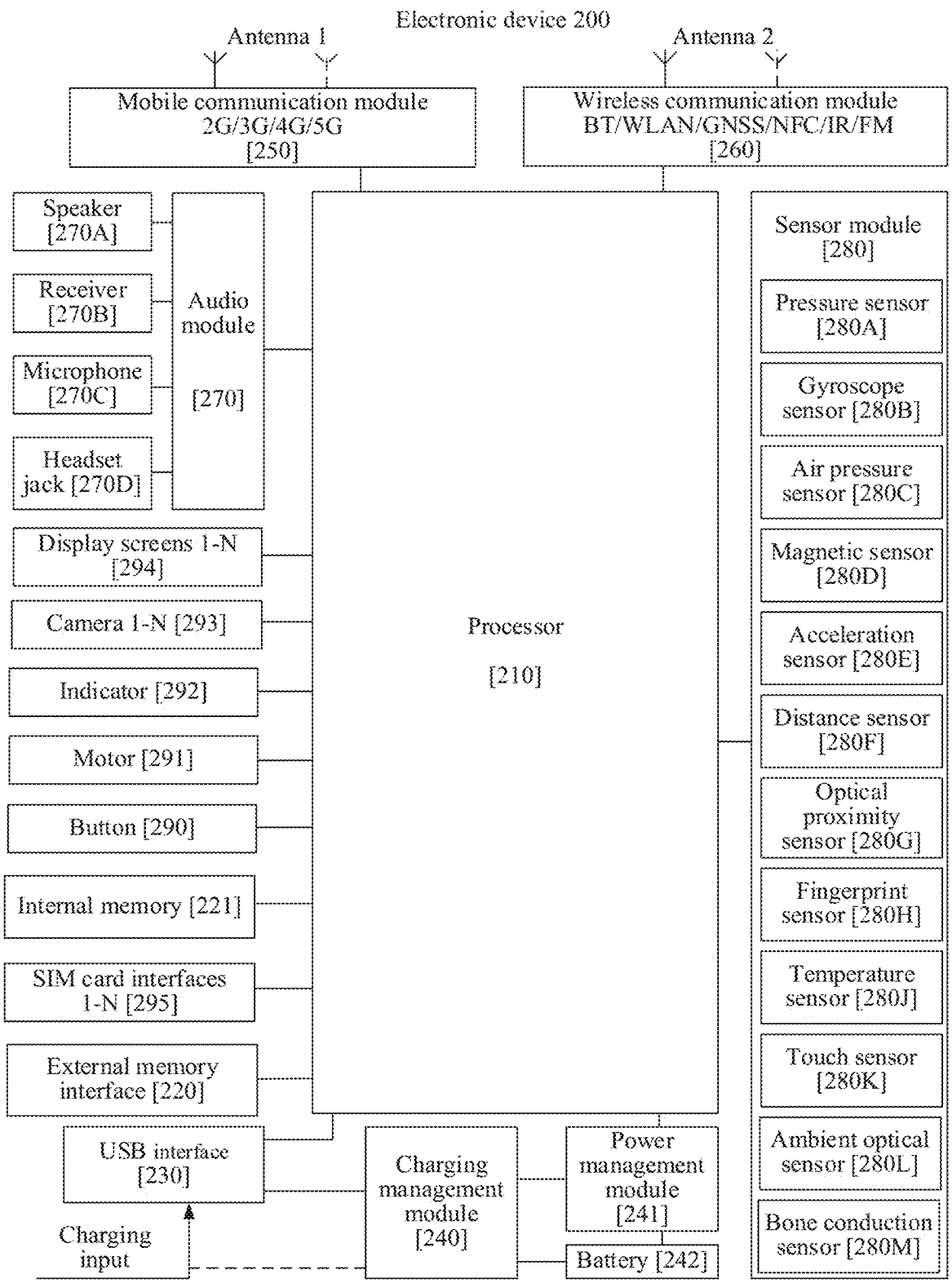
FIG. 2 is a schematic diagram of a structure of an electronic device according to an embodiment of this application.

FIG. 2 is a schematic diagram of a structure of an electronic device according to an embodiment of this application. The electronic device 200 may be the terminal device 101 in FIG. 1, or may be the server device 102 in FIG. 1.

The electronic device 200 may include a processor 210, an external memory interface 220, an internal memory 221, a universal serial bus (universal serial bus, USB) interface 230, a charging management module 240, a power management module 241, a battery 242, an antenna 1, an antenna 2, a mobile communication module 250, a wireless communication module 260, an audio module 270, a speaker 270A, a receiver 270B, a microphone 270C, a headset jack 270D, a sensor module 280, a button 290, a motor 291, an indicator 292, a camera 293, a display screen 294, a subscriber identity module (subscriber identity module, SIM) card interface 295, and the like. The sensor module 280 may include a pressure sensor 280A, a gyroscope sensor 280B, an air pressure sensor 280C, a magnetic sensor 280D, an acceleration sensor 280E, a distance sensor 280F, an optical proximity sensor 280G, a fingerprint sensor 280H, a temperature sensor 280J, a touch sensor 280K, an ambient optical sensor 280L, a bone conduction sensor 280M, and the like.

It may be understood that a structure shown in this embodiment of the present invention does not constitute a specific limitation on the electronic device 200. In some other embodiments of this application, the electronic device 200 may include more or fewer components than those shown in the figure, or combine some components, or split some components, or have a different component arrangement. Illustrated components may be implemented in hardware, software, or a combination of software and hardware.

The processor 210 may include one or more processing units. For example, the processor 210 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural network processing unit (neural network processing unit, NPU), and the like. Different processing units may be independent components, or may be integrated into one or more processors.

The controller may generate an operation control signal based on instruction operation code and a time sequence signal, to complete control of instruction reading and instruction execution.

A memory may be further disposed in the processor 210, and is configured to store instructions and data. In some embodiments, the memory in the processor 210 is a cache. The memory may store instructions or data just used or cyclically used by the processor 210. If the processor 210 needs to use the instructions or the data again, the processor may directly invoke the instructions or the data from the memory. This avoids repeated access, reduces a waiting time of the processor 210, and improves system efficiency.

In some embodiments, the processor 210 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identification module (subscriber identification module, SIM) interface, a universal serial bus (universal serial bus, USB) interface, and/or the like.

The I2C interface is a two-way synchronization serial bus, and includes a serial data line (serial data line, SDA) and a serial clock line (serial clock line, SCL). In some embodiments, the processor 210 may include a plurality of groups of I2C buses. The processor 210 may be separately coupled to the touch sensor 280K, a charger, a flashlight, the camera 293, and the like through different I2C bus interfaces. Examples are as follows: The processor 210 may be coupled to the touch sensor 280K through an I2C interface, so that the processor 210 communicates with the touch sensor 280K through an I2C bus interface, to implement a touch function of the electronic device 200.

The I2S interface can be used for audio communication. In some embodiments, the processor 210 may include a plurality of groups of I2S buses. The processor 210 may be coupled to the audio module 270 through an I2S bus, to implement communication between the processor 210 and the audio module 270. In some embodiments, the audio module 270 may transmit an audio signal to the wireless communication module 260 through an I2S interface, to implement a function of answering a call by using a Bluetooth headset.

The PCM interface may also be used for audio communication, sampling, quantizing, and encoding analog signals. In some embodiments, the audio module 270 and the wireless communication module 260 may be coupled through a PCM bus interface. In some embodiments, the audio module 270 may also transmit an audio signal to the wireless communication module 260 through a PCM interface, to implement a function of answering a call by using a Bluetooth headset. Both the I2S interface and the PCM interface may be used for audio communication.

An UART interface is a universal serial data bus for asynchronous communication. The bus may be a bidirectional communication bus. The bus converts to-be-transmitted data between serial communication and parallel communication. In some embodiments, the UART interface is generally configured to connect the processor 210 and the wireless communication module 260. For example, the processor 210 communicates with a Bluetooth module in the wireless communication module 260 through the UART interface, to implement a Bluetooth function. In some embodiments, the audio module 270 may transmit an audio signal to the wireless communication module 260 through the UART interface, to implement a function of playing music by using a Bluetooth headset.

The MIPI interface may be configured to connect the processor 210 to peripheral devices such as the display screen 294 and the camera 293. The MIPI interface includes a camera serial interface (camera serial interface, CSI), a display serial interface (display serial interface, DSI), and the like. In some embodiments, the processor 210 and the camera 293 communicate with each other through a CSI interface, to implement a photographing function of the electronic device 200. The processor 210 communicates with the display screen 294 through the DSI interface, to implement a display function of the electronic device 200.

The GPIO interface may be configured by using software. The GPIO interface may be configured as a control signal or a data signal. In some embodiments, the GPIO interface may be configured to connect the processor 210 to the camera 293, the display screen 294, the wireless communication module 260, the audio module 270, the sensor module 280, and the like. The GPIO interface may further be configured as an I2C interface, an I2S interface, a UART interface, or an MIPI interface.

The USB interface 230 is a port that conforms to a USB standard specification, and may be specifically a mini USB interface, a micro USB interface, a USB Type-C interface, or the like. The USB interface 230 may be configured to connect to a charger to charge the electronic device 200, or may be configured to perform data transmission between the electronic device 200 and a peripheral device. The USB interface 230 may also be configured to connect a headset to play audio through the headset. The port may be further configured to connect to another electronic device, for example, an AR device.

It may be understood that a port connection relationship between the modules that is shown in this embodiment of the present invention is merely an example for description, and does not constitute a limitation on the structure of the electronic device 200. In some other embodiments of this application, the electronic device 200 may alternatively use a port connection manner different from the port connection manner in the foregoing embodiment, or a combination of a plurality of port connection manners.

The charging management module 240 is configured to receive a charging input from a charger. The charger may be a wireless charger, or may be a wired charger. In some embodiments of wired charging, the charging management module 240 may receive a charging input of a wired charger through the USB interface 230. In some embodiments of wireless charging, the charging management module 240 may receive a wireless charging input through a wireless charging coil of the electronic device 200. When charging the battery 242, the charging management module 240 may further supply power to the electronic device through the power management module 241.

The power management module 241 is configured to connect the battery 242, the charging management module 240, and the processor 210. The power management module 241 receives input of the battery 242 and/or the charging management module 240, and supplies power to the processor 210, the internal memory 221, the display screen 294, the camera 293, the wireless communication module 260, and the like. The power management module 241 may be further configured to monitor parameters such as a battery capacity, a quantity of battery cycles, and a battery health status (electric leakage and impedance). In some other embodiments, the power management module 241 may alternatively be disposed in the processor 210. In some embodiments, the power management module 241 and the charging management module 240 may alternatively be disposed in a same component.

A wireless communication function of the electronic device 200 may be implemented through the antenna 1, the antenna 2, the mobile communication module 250, the wireless communication module 260, the modem processor, the baseband processor, and the like.

The antenna 1 and the antenna 2 are configured to transmit and receive electromagnetic wave signals. Each antenna in the electronic device 200 may be configured to cover one or more communication frequency bands. Different antennas may be further reused, to improve antenna utilization. Examples are as follows: the antenna 1 may be reused as a diversity antenna of a wireless local area network. In other embodiments, the antenna may be used in conjunction with a tuning switch.

The mobile communication module 250 may provide a wireless communication solution that is applied to the electronic device 200 and includes a 2G/3G/4G/5G or the like. The mobile communication module 250 may include at least one filter, a switch, a power amplifier, a low noise amplifier (low noise amplifier, LNA), and the like. The mobile communication module 250 may receive an electromagnetic wave through the antenna 1, perform processing such as filtering or amplification on the received electromagnetic wave, and transmit the electromagnetic wave to the modem processor for demodulation. The mobile communication module 250 may further amplify a signal modulated by the modem processor, and convert the signal into an electromagnetic wave for radiation through the antenna 1. In some embodiments, at least some functional modules in the mobile communication module 250 may be disposed in the processor 210. In some embodiments, at least some functional modules of the mobile communication module 250 may be disposed in a same component as at least some modules in the processor 210.

The modem processor may include a modulator and a demodulator. The modulator is configured to modulate a to-be-sent low-frequency baseband signal into a medium- and high-frequency signal. The demodulator is configured to demodulate a received electromagnetic wave signal into a low-frequency baseband signal. Then, the demodulator transmits a demodulated low-frequency baseband signal to the baseband processor for processing. The low-frequency baseband signal is processed by the baseband processor and then transmitted to the application processor. The application processor outputs a sound signal by using an audio device (which is not limited to the speaker 270A, the receiver 270B, and the like), or displays an image or a video through the display screen 294. In some embodiments, the modem processor may be an independent component. In some other embodiments, the modem processor may be independent of the processor 210, and is disposed in a same device as the mobile communication module 250 or another functional module.

The wireless communication module 260 may provide a wireless communication solution that includes a wireless local area network (wireless local area network, WLAN) (for example, a wireless fidelity (wireless fidelity, Wi-Fi) network), Bluetooth (Bluetooth, BT), a global navigation satellite system (global navigation satellite system. GNSS), frequency modulation (frequency modulation, FM), near field communication (near field communication, NFC), an infrared (infrared, IR) technology, or the like and that is applied to the electronic device 200. The wireless communication module 260 may be one or more components integrating at least one communication processing module. The wireless communication module 260 receives an electromagnetic wave by the antenna 2, performs frequency modulation and filtering processing on an electromagnetic wave signal, and sends a processed signal to the processor 210. The wireless communication module 260 may further receive a to-be-sent signal from the processor 210, perform frequency modulation and amplification on the signal, and convert the signal into an electromagnetic wave for radiation through the antenna 2.

In some embodiments, the antenna 1 of the electronic device 200 is coupled to the mobile communication module 250, and the antenna 2 is coupled to the wireless communication module 260, so that the electronic device 200 can communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC. FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system. BDS), a quasi-zenith satellite system (quasi-zenith satellite system, QZSS), and/or a satellite based augmentation system (satellite based augmentation systems, SBAS).

The electronic device 200 implements a display function by using a GPU, a display screen 294, an application processor, and the like. The GPU is a microprocessor for image processing, and is connected to the display screen 294 and the application processor. The GPU is configured to perform mathematical and geometric calculations for graphics rendering. The processor 210 may include one or more GPUs that execute program instructions to generate or change display information.

The display screen 294 is configured to display an image, a video, or the like. The display screen 294 includes a display panel. The display panel may be a liquid crystal display (liquid crystal display. LCD), an organic light-emitting diode (organic light-emitting diode, OLED), an active-matrix organic light-emitting diode (active-matrix organic light-emitting diode, AMOLED), a flexible light-emitting diode (flexible light-emitting diode. FLED), a mini-LED, a micro-LED, a micro-OLED, quantum dot light-emitting diode (quantum dot light-emitting diode, QLED), or the like. In some embodiments, the electronic device 200 may include one or N display screens 294, where N is a positive integer greater than 1.

The electronic device 200 may implement a photographing function by using the ISP, the camera 293, the video codec, the GPU, the display screen 294, the application processor, or the like.

The ISP is configured to process data fed back by the camera 293. For example, during photographing, a shutter is opened, light is transmitted to a photosensitive element of the camera through a lens, an optical signal is converted into an electrical signal, and the photosensitive element of the camera transmits the electrical signal to the ISP for processing, and converts the electrical signal into an image visible to naked eyes. The ISP may further algorithmically optimize image noise, luminance, and skin tone. The ISP may further optimize parameters such as exposure and color temperature of a photographing scene. In some embodiments, the ISP may be disposed in the camera 293.

The camera 293 is configured to capture a static image or a video. An object is projected to the photosensitive element by generating an optical image through the lens. The photosensitive element may be a charge coupled device (charge coupled device, CCD) or a complementary metal-oxide-semiconductor (complementary metal-oxide-semiconductor, CMOS) phototransistor. The photosensitive element converts the optical signal into the electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the electronic device 200 may include one or N cameras 293, where N is a positive integer greater than 1.

For example, the camera 293 may be a color camera. The color camera is configured to acquire a color image of a target object, and includes a common color camera in a currently popular terminal product. The distance sensor 280F is configured to obtain depth information of the target object. For example, the distance sensor 280F may be implemented by using a time of flight (Time of Flight, TOF) technology and a structured light technology.

In the TOF technology, a sensor (for example, a depth sensor module) emits modulated near-infrared light, and reflects the modulated near-infrared light after encountering an object. The sensor calculates a time difference or a phase difference between light emission and reflection, to convert a distance of a photographed scene, to generate the depth information. In addition, combined with RGB camera photographing, a three-dimensional outline of an object can be presented in a topographic map with different colors representing different distances.

Structured light is a system structure composed of a projection element and a camera The projection element is configured to project specific light information (such as grating diffraction) to a surface of the object and a background, and then the project specific light is acquired by the camera. A location, a depth, and the like of information of the object is calculated based on changes (such as a change and displacement of light thickness) of an optical signal caused by the object. And then entire three-dimensional space is restored.

The digital signal processor is configured to process digital signals, and may process other digital signals in addition to digital image signals. For example, when the electronic device 200 selects a frequency, the digital signal processor is configured to perform Fourier transform on frequency energy and the like.

The video codec is configured to compress or decompress digital video. The electronic device 200 may support one or more video codecs. In this way, the electronic device 200 may play or record videos in a plurality of encoding formats, for example, moving picture experts group (moving picture experts group, MPEG) 1, MPEG 2, MPEG 3, and MPEG 4.

The NPU is a neural-network (neural-network, NN) computation processor. The NPU quickly processes input information by referring to a structure of a biological neural network, for example, by referring to a mode of transmission between human brain neurons, and continuously performs self-learning. Applications such as intelligent cognition of the electronic device 200 may be implemented by using the NPU, for example, image recognition, facial recognition, speech recognition, and text understanding.

The external memory interface 220 may be configured to connect to an external memory card, for example, a Micro SD card, to expand a storage capability of the electronic device 200. The external storage card communicates with the processor 210 through the external memory interface 220, to implement a data storage function. For example, files such as music and a video are stored in the external memory card.

The internal memory 221 may be configured to store computer-executable program code, and the executable program code includes instructions. The internal memory 221 may include a program storage area and a data storage area. The program storage area may store an operating system, an application required by at least one function (for example, a voice playing function or an image playing function), and the like. The data storage area may store data (for example, audio data or a phone book) created in a process of using the electronic device 200. In addition, the internal memory 221 may include a high-speed random access memory, or may include a nonvolatile memory, for example, at least one magnetic disk storage device, a flash memory, or a universal flash storage (universal flash storage, UFS). The processor 210 runs the instructions stored in the internal memory 221 and/or the instructions stored in the memory disposed in the processor, to perform various function applications of the electronic device 200 and data processing.

The electronic device 200 may implement an audio function through the audio module 270, the speaker 270A, the receiver 270B, the microphone 270C, the headset jack 270D, the application processor, and the like. For example, music playing or recording.

The audio module 270 is configured to convert digital audio information into analog audio signal output, and is also configured to convert analog audio input into a digital audio signal. The audio module 270 may be further configured to encode and decode an audio signal. In some embodiments, the audio module 270 may be disposed in the processor 210, or some function modules of the audio module 270 may be disposed in the processor 210.

The loudspeaker 270A, also referred to as a "horn", is configured to convert an audio electrical signal into an audio signal. The electronic device 200 may listen to music or listen to a hands-free call through the speaker 270A.

The receiver 270B, also referred to as an "earpiece", is configured to convert an audio electrical signal into a sound signal. When the electronic device 200 answers a call or voice information, the receiver 270B may be placed close to the human ear to answer the voice.

The microphone 270C, also referred to as a "mike" or a "mic", is configured to convert a sound signal into an electrical signal. When making a call or sending voice information, the user may make a sound by using a human mouth close to the microphone 270C, and input a sound signal to the microphone 270C. At least one microphone 270C may be disposed in the electronic device 200. In some other embodiments, two microphones 270C may be disposed in the electronic device 200, to implement a noise reduction function in addition to acquiring a sound signal. In some other embodiments, three, four, or more microphones 270C may alternatively be disposed in the electronic device 200, to acquire a sound signal, reduce noise, identify a sound source, implement a directional recording function, and the like.

The headset jack 270D is configured to connect to a wired headset. The headset jack 270D may be the USB interface 230, or may be a 3.5 mm open mobile terminal platform (open mobile terminal platform. OMTP) standard interface or a cellular telecommunications industry association of the USA (cellular telecommunications industry association of the USA, CTIA) standard interface.

The pressure sensor 280A is configured to sense a pressure signal, and may convert the pressure signal into an electrical signal. In some embodiments, the pressure sensor 280A may be disposed on the display screen 294. There are many kinds of pressure sensors 280A, such as resistive pressure sensors, inductive pressure sensors, capacitive pressure sensors, and the like. The capacitive pressure sensor may include at least two parallel plates having conducting materials. When a force is applied to the pressure sensor 280A, a capacitance between electrodes changes. The electronic device 200 determines pressure strength based on a change of the capacitance. When a touch operation is performed on the display screen 294, the electronic device 200 detects touch operation intensity based on the pressure sensor 280A. The electronic device 200 may also calculate a touch location based on a detection signal of the pressure sensor 280A In some embodiments, touch operations that are performed at a same touch location but have different touch operation intensities may correspond to different operation instructions. Examples are as follows: When a touch operation whose touch operation intensity is less than a first pressure threshold is performed on an SMS message application icon, an instruction for viewing a new SMS message is performed. When a touch operation whose touch operation intensity is greater than or equal to the first pressure threshold is performed on the SMS message application icon, an instruction for creating a new SMS message is performed.

The gyroscope sensor 280B may be configured to determine a motion posture of the electronic device 200. In some embodiments, an angular velocity of the electronic device 200 around three axes (that is, axes x, y, and z) may be determined through the gyroscope sensor 280B. The gyroscope sensor 280B may be configured for photographing image stabilization. For example, when a shutter is pressed, the gyroscope sensor 280B detects an angle at which the electronic device 200 jitters, and calculates, based on the angle, a distance that needs to be compensated by a lens module, so that a lens cancels the jitter of the electronic device 200 through reverse motion, thereby implementing image stabilization. The gyroscope sensor 280B may be further configured for navigation and motion-controlled gaming scenarios.

The air pressure sensor 280C is configured to measure air pressure. In some embodiments, the electronic device 200 calculates an altitude through an air pressure value measured by the air pressure sensor 280C, to assist positioning and navigation.

The magnetic sensor 280D includes a Hall sensor. The electronic device 200 may detect opening and closing of a flip leather sheath through the magnetic sensor 280D. In some embodiments, when the electronic device 200 is a flip machine, the electronic device 200 may detect opening and closing of a flip cover based on the magnetic sensor 280D. Then, a feature such as automatic unlocking of the flip cover is set based on a detected opening and closing state of a leather sheath or the detected opening and closing state of the flip cover.

The acceleration sensor 280E may detect magnitude of accelerations in various directions (usually on three axes) of the electronic device 200. Magnitude and a direction of gravity may be detected when the electronic device 200 is static. The acceleration sensor 280E may also be configured to identify a posture of an electronic device, and is applied to applications such as landscape/portrait switching, a pedometer.

The distance sensor 280F is configured to measure a distance. The electronic device 200 may measure a distance through infrared or laser. In some embodiments, in a photographing scene, the electronic device 200 may use the distance sensor 280F to measure a distance, to implement fast focusing.

The optical proximity sensor 280G may include, for example, a light-emitting diode (LED) and a photodetector, such as, a photodiode. The light-emitting diode may be an infrared light-emitting diode. The electronic device 200 emits infrared light outwards through the light-emitting diode. The electronic device 200 detects infrared reflected light from a nearby object by using a photodiode. When sufficient reflected light is detected, that there is an object near the electronic device 200 may be determined. When insufficient reflected light is detected, the electronic device 200 may determine that there is no object near the electronic device 200. The electronic device 200 may detect, by using the optical proximity sensor 280G, that the user holds the electronic device 200 close to an ear to make a call, to automatically turn off a screen to save power. The optical proximity sensor 280G may also be configured in a leather sheath mode, and a pocket mode automatically unlocks and locks the screen.

The ambient optical sensor 280L is configured to sense ambient brightness. The electronic device 200 may adaptively adjust brightness of the display screen 294 based on perceived ambient brightness. The ambient optical sensor 280L may also be configured to automatically adjust white balance when taking photos. The ambient optical sensor 280L may further work with the optical proximity sensor 280G to detect whether the electronic device 200 is in a pocket, to prevent accidental touch.

The fingerprint sensor 280H is configured to acquire a fingerprint. The electronic device 200 may implement fingerprint unlock, access app lock, fingerprint photographing, fingerprint incoming call answering, and the like by using an acquired fingerprint feature.

The temperature sensor 280J is configured to detect a temperature. In some embodiments, the electronic device 200 executes a temperature processing policy by using the temperature detected by the temperature sensor 280J. For example, when a temperature reported by the temperature sensor 280J exceeds a threshold, the electronic device 200 reduces performance of a processor located near the temperature sensor 280J, to reduce power consumption and implement thermal protection. In some other embodiments, when the temperature is lower than another threshold, the electronic device 200 heats the battery 242, to avoid abnormal shutdown of the electronic device 200 caused by a low temperature. In some other embodiments, when the temperature is lower than another threshold, the electronic device 200 boosts an output voltage of the battery 242, to avoid abnormal shutdown caused by a low temperature.

The touch sensor 280K is also referred to as a "touch device". The touch sensor 280K may be disposed on the display screen 294. The touch sensor 280K and the display screen 294 form a touch screen, which is also referred to as a "touchscreen". The touch sensor 280K is configured to detect a touch operation performed on or near the touch sensor 280K. The touch sensor may transfer a detected touch operation to the application processor, to determine a touch event type. A visual output related to the touch operation may be provided through the display screen 294. In some other embodiments, the touch sensor 280K may also be disposed on a surface of the electronic device 200, and a location of the touch sensor 280K is different from the location of the display screen 294.

The bone conduction sensor 280M may acquire a vibration signal. In some embodiments, the bone conduction sensor 280M may acquire a vibration signal of a vibration bone of a human vocal part. The bone conduction sensor 280M may also contact a human pulse and receive a blood pressure beat signal. In some embodiments, the bone conduction sensor 280M may also be disposed in a headset, combined to form a bone conduction headset. The audio module 270 may obtain a voice signal through parsing based on the vibration signal that is of the vibration bone of the vocal part and that is obtained by the bone conduction sensor 280M, to implement a voice function. The application processor may parse heart rate information based on a blood pressure beat signal obtained by the bone conduction sensor 280M, to implement a heart rate detection function.

The button 290 includes a power button, a volume button, and the like. The button 290 may be a mechanical button, and may also be a touch key. The electronic device 200 may receive a key input, and generate a key signal input related to a user setting and function control of the electronic device 200.

The motor 291 may generate a vibration prompt. The motor 291 may be configured to provide an incoming call vibration prompt and a touch vibration feedback. For example, touch operations performed on different applications (such as photographing and audio playing) may correspond to different vibration feedback effects. The motor 291 may also correspond to different vibration feedback effects for touch operations performed on different areas of the display screen 294. Different application scenarios (for example, time reminder, information receiving, alarm clock, and game) may also correspond to different vibration feedback effects. A touch vibration feedback effect may further be customized.

The indicator 292 may be an indicator light, and may be configured to indicate a charging status and a power change, or may be configured to indicate a message, a missed call, a notification, or the like.

The SIM card interface 295 is configured to connect to a SIM card. The SIM card may be inserted into the SIM card interface 295, or removed from the SIM card interface 295, to implement contact and separation from the electronic device 200. The electronic device 200 may support one or N SIM card interfaces, where N is a positive integer greater than 1. The SIM card interface 295 may support a nano-SIM card, a micro-SIM card, a SIM card, and the like. A plurality of cards may be inserted into the same SIM card interface 295 at the same time. Types of the plurality of cards may be the same or different. The SIM card interface 295 may also be compatible with different types of SIM cards. The SIM card interface 295 may also be compatible with an external memory card. The electronic device 200 interacts with a network through a SIM card, to implement functions such as call and data communication. In some embodiments, the electronic device 200 uses an eSIM, that is, embedded SIM card. The eSIM card may be embedded in the electronic device 200, and cannot be separated from the electronic device 200.

In a possible implementation, a 3D model reconstruction tool includes two parts: an IDE and an AR Cloud. The user can upload photos, view execution progress, and preview 3D models through the IDE. The AR Cloud is configured to perform a 3D model reconstruction calculation process and generate 3D models.

However, a process in which the AR Cloud performs 3D model reconstruction is time-consuming. For example, after uploading a photo to the AR Cloud, the user may need to wait for more than 5 hours to view a reconstruction result of the AR Cloud. It may be understood that quality of a photo uploaded by the user affects quality of a reconstructed 3D model. If the photo uploaded by the user does not meet a requirement, for example, the uploaded photo is incomplete, a definition of the photo is insufficient, or an angle or a distance of the photo does not meet the requirement, the reconstructed 3D model is not fine enough, the model is missing, deformed, and the like. In this case, the user may only take photos again and upload the photos to the AR Cloud. The AR Cloud re-creates a 3D model. The user needs to wait for a 3D model reconstruction process again, which wastes time of a user and deteriorates user experience.

For this problem, an embodiment of this application provides a 3D model reconstruction solution. Before 3D model reconstruction is performed, a user submits a quality expectation on a 3D model, and generates an image acquisition solution based on the quality expectation of the user on the 3D model, to guide the user to acquire a photo of a reconstructed object. It may be understood that, compared with photos acquired by the user, photos acquired under guidance of the image acquisition solution have higher quality, improving a one-time reconstruction success rate. In addition, a 3D model reconstruction effect may be further estimated in advance based on the photos acquired by the user, and a 3D model reconstruction process is performed only after the 3D model reconstruction effect meets a quality expectation of the user, to further improve the one-time reconstruction success rate. The following provides detailed description with reference to the accompanying drawings.

Figure 3:
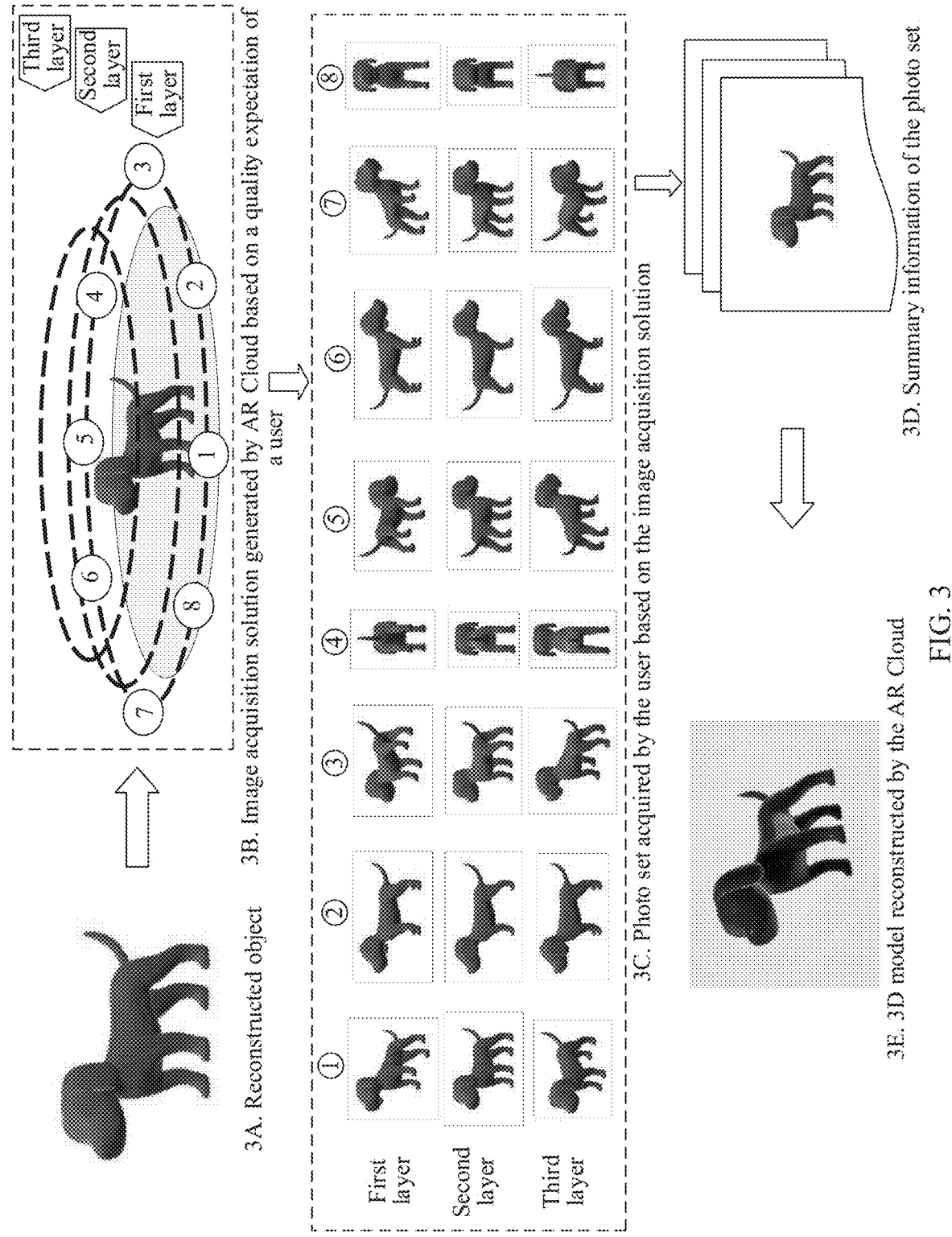
FIG. 3 is a schematic diagram of a 3D model reconstruction scenario according to an embodiment of this application.

FIG. 3 is a schematic diagram of a 3D model reconstruction scenario according to an embodiment of this application. In FIG. 3, an animal model toy is used as an example to briefly describe the 3D model reconstruction scenario according to this embodiment of this application.

FIG. 3A is a reconstructed object. The reconstructed object is an animal model toy owned by a user. The user wants to perform 3D model reconstruction on the animal model toy. In other words, a 3D model that the user wants to reconstruct is a 3D model corresponding to the animal model toy. Before performing the 3D model reconstruction, the user submits a quality expectation on the 3D model. For example, the user wants to construct a 3D model having 100) faces, a mean square error (Mean Square Error, MSE) within 2 mm, and a diameter within 10 cm. A quantity of faces is used for describing a quantity of polygons forming the 3D model. The larger the quantity of faces is, the smoother the model is, and the richer details are. The MSE is used for describing a mean square error between a point of a modelled 3D model and a point corresponding to an actual object. The diameter is used for describing a diameter of a sphere corresponding to the 3D model. That is, a size of the 3D model is measured by using a size of the sphere corresponding to the 3D model. Certainly, the size of the 3D model may also be measured by using a length, a width, and a height of the 3D model.

FIG. 3B shows an image acquisition solution generated by AR Cloud based on the quality expectation of the user. After the user submits the quality expectation on a 3D model to the AR Cloud, the AR Cloud generates a corresponding image acquisition solution based on the quality expectation. In FIG. 3B, the image acquisition solution requires the user to take 24 photos at a distance of 60 cm from the animal model toy, from eight angles, and in three layers in height.

FIG. 3C is the 24 photos of the animal model toy acquired by the user according to the image acquisition solution, divided into three layers in height, and each layer has eight photos. For different layers, photo acquisition is performed from different height view angles. For example, first-layer photos in FIG. 3C are a bottom view of the animal model toy, second-layer photos are a top view of the animal model toy, and third-layer photos are a top view of the animal model toy. For the same layer, photos of the animal model toy are acquired from 8 angles around, for example, one photo is acquired every 45°, and 8 photos are acquired from locations 0°, 45°, 90°, 135°, 180°, 225°, 270°, and 315°. It may be understood that the image acquisition solution herein is merely an example for description. The AR Cloud generates different image acquisition solutions based on different quality expectations. For example, in addition to acquiring photos hierarchically in height, the user may be required to acquire photos hierarchically in depth.

FIG. 3D shows summary information of a photo set. After completing the photo acquisition, the user generates the summary information of the photo set based on an acquired photo set, and sends the summary information to the AR Cloud. The AR Cloud verifies, based on the summary information, whether the photo set acquired by the user meets a 3D model reconstruction requirement. For example, the summary information may include a quantity of photos, an acquisition angle of each photo, a low-resolution version of the photo, and the like. After receiving the summary information, the AR Cloud determines photographing quality of each photo based on the summary information, for example, resolution, illumination, saturation, definition, a proportion of an object in the photo, a photographing angle, and a background color of the photo. Then, whether the photo set acquired by the user can meet the 3D model reconstruction requirement is determined. If it is determined that the 3D model reconstruction requirement can be met, a 3D model reconstruction operation is performed; otherwise, after the user is notified to supplement the photo, whether the photo acquired by the user meets the 3D model reconstruction requirement is re-determined.

FIG. 3E shows a 3D model reconstructed by the AR Cloud. After completing the 3D model reconstruction, the AR Cloud sends the reconstructed 3D model to a terminal device. The user obtains the 3D model of the animal model toy, and completes the 3D model reconstruction.

In embodiments of this application, by adding a reconstruction communication link in a 3D model reconstruction process for communication about a 3D model reconstruction requirement and an image acquisition solution, a problem of a 3D model reconstruction failure caused by that an acquired two-dimensional image does not meet the 3D model reconstruction requirement is avoided, thereby improving a one-time reconstruction success rate.

Figure 4:
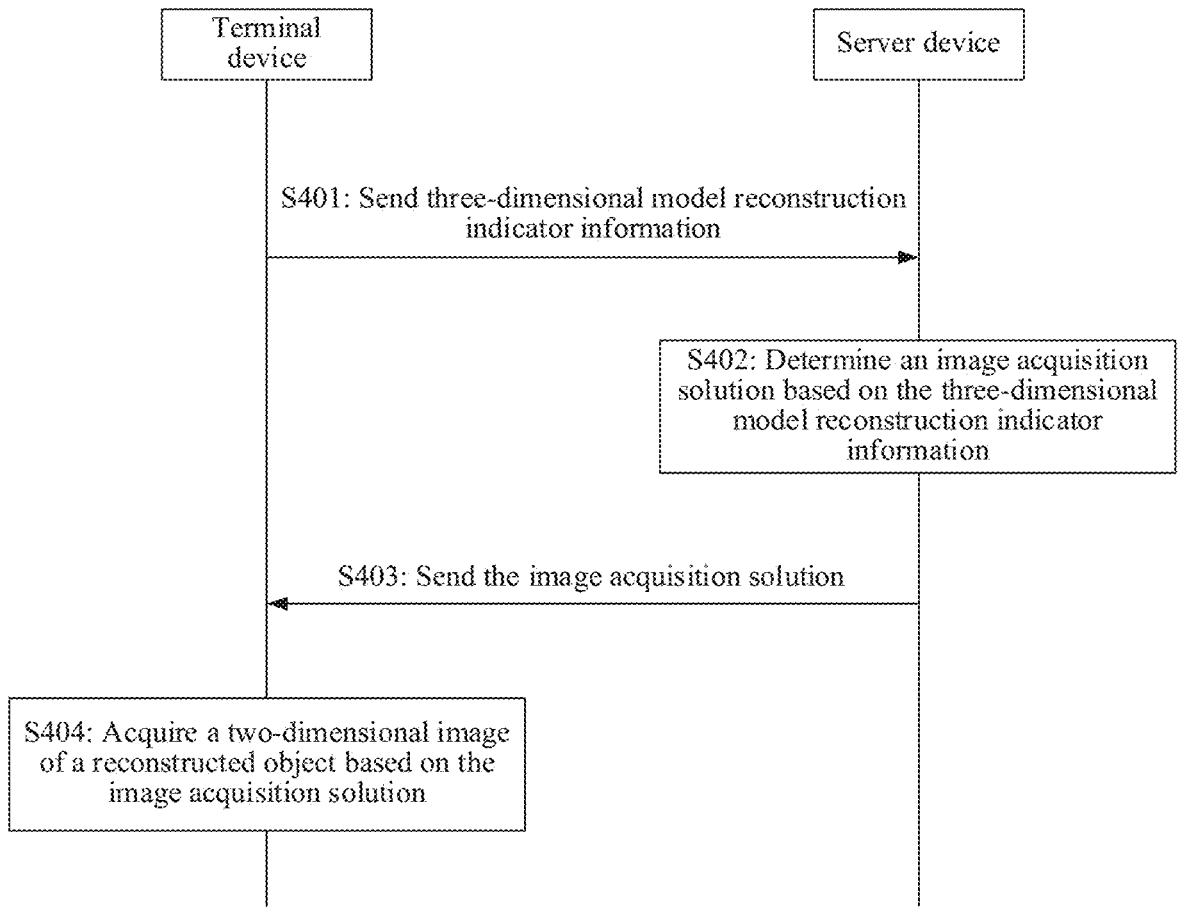
FIG. 4 is a schematic flowchart of a three-dimensional model reconstruction method according to an embodiment of this application.

FIG. 4 is a schematic flowchart of a three-dimensional model reconstruction method according to an embodiment of this application. The method may be applied to the devices shown in FIG. 1. As shown in FIG. 4, the method mainly includes the following steps.

Step S401: A terminal device sends three-dimensional model reconstruction indicator information to the server device.

The three-dimensional model reconstruction indicator information is used for representing a three-dimensional model reconstruction requirement. In an optional embodiment, the three-dimensional model reconstruction indicator information includes quality indicator information and/or object indicator information of a 3D model. The quality indicator information is used for representing quality of a to-be-reconstructed 3D model, and the object indicator information is used for representing a size of the to-be-reconstructed 3D model.

Specifically, quality of the 3D model includes indicators such as accuracy, integrity, and consistency of the 3D model, and may be measured through a mean square error (Mean Square Error. MSE) and/or an intersection over union (Intersection over Union, IoU). The MSE is used for describing a mean square error between a point of a modelled 3D model and a point corresponding to an actual object. The IoU is used for describing a ratio of an intersection and a union of the modelled 3D model and the actual object. It should be noted that the quality indicator information is related to a quantity of faces of the modelled 3D model. A higher quality indicator indicates a larger quantity of faces of the modelled 3D model. The quantity of faces refers to a quantity of polygons forming the 3D model. The larger the quantity of faces is, the smoother the model is, and the richer details are. It may be understood that the higher quality indicator indicates a larger quantity and higher quality of photos that need to be acquired by the user, a longer time required for 3D model reconstruction, and more computing resources consumed. The computing resources include a memory resource, a processor resource, and the like.

According to one aspect, a size of the 3D model may be represented by a length, a width, and a height of the 3D model. According to another aspect, the size of the 3D model may be represented by a diameter of a sphere corresponding to the 3D model. It may be understood that a larger size of the 3D model indicates a larger quantity and higher quality of photos that need to be acquired by the user, a longer time required in a process of generating the 3D model from a two-dimensional image, and more computing resources consumed.

FIG. 5A to FIG. 5D are schematic diagrams of a three-dimensional model reconstruction indicator configuration scenario according to an embodiment of this application. Before a terminal device sends three-dimensional model reconstruction indicator information to a server device, the terminal device displays a three-dimensional model reconstruction indicator configuration window, and a user may enter an expected quality indicator and/or an object indicator at a corresponding location in the window, to configure a three-dimensional model reconstruction indicator. Information entered by the user in the window is three-dimensional model reconstruction indicator input information. For example, in an input area of the window, the user enters: "IoU, 99%; object size, 8 cm". It should be noted that, in the embodiment shown in FIG. 5A, an IoU is used for describing a quality indicator. Certainly, a person skilled in the art may also describe the quality indicator by using an MSE based on an actual requirement, or describe the quality indicator by using the MSE and the IoU. This is not limited in this embodiment of this application.

To facilitate user operations, the quality indicator may be further divided into three options: high, medium, and low for user selection. For example, in a quality indicator field, the user enters: "Quality indicator, high" without entering a specific value for the quality indicator.

In addition, the three-dimensional model reconstruction indicator information may further include performance indicator information, where the performance indicator information is used for representing resources expected to be consumed by the user in a 3D model reconstruction process, and the resources expected to be consumed by the user includes a time resource and/or a computing resource expected to be consumed by the user. For example, duration expected to be consumed and/or computing resources estimated to be used, where the computing resources include internal memory, processor resources, and the like. For example, a user wants to rebuild a 3D model within six hours, occupying 1.8 G internal memory and a single-core processor. The performance indicator information is resource consumption expected by the user during 3D model reconstruction.

Figure 5A:
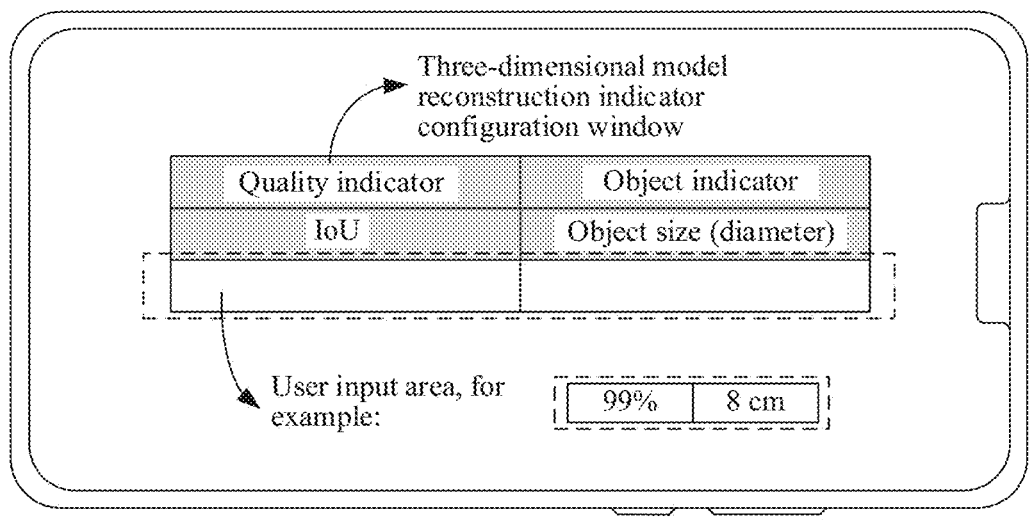
FIG. 5A to FIG. 5D are schematic diagrams of a three-dimensional model reconstruction indicator configuration scenario according to an embodiment of this application.
Figure 5B:
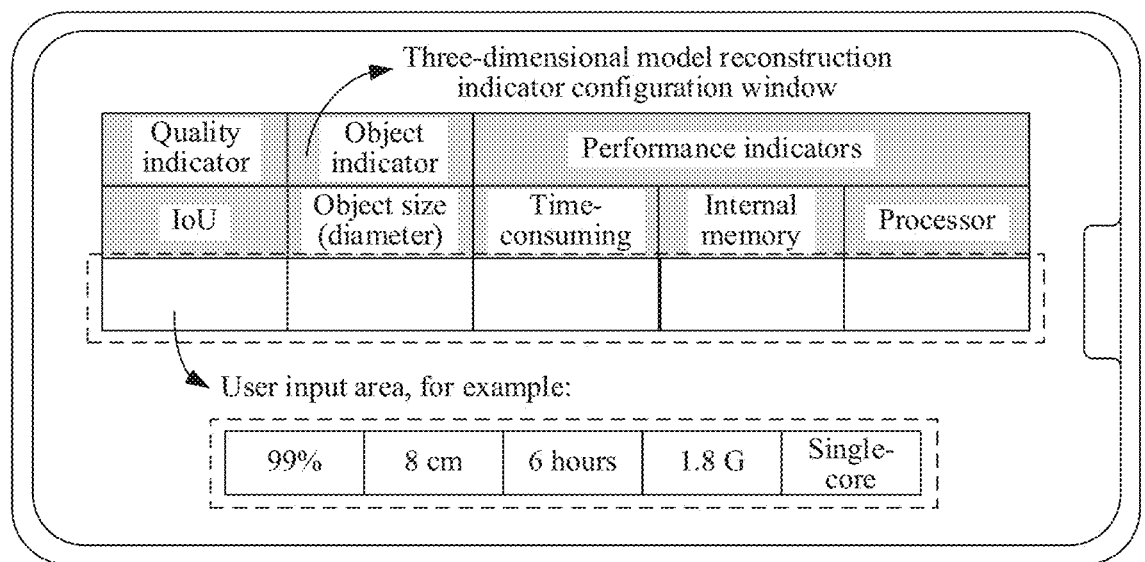

As shown in FIG. 5B, the three-dimensional model reconstruction indicator configuration window in FIG. 5B includes a quality indicator, an object indicator, and a performance indicator. The user may enter an expected quality indicator, an object indicator, and/or a performance indicator at a corresponding location in the window, to configure the three-dimensional model reconstruction indicator.

It can be understood that higher computing resource configuration indicates a faster 3D model reconstruction speed and a shorter consumed duration. However, in an actual application scenario, different computing resources occupied by the user in the AR Cloud may correspond to different tariffs. The user may select a corresponding computing resource based on an expected cost of the user.

Figure 5C:
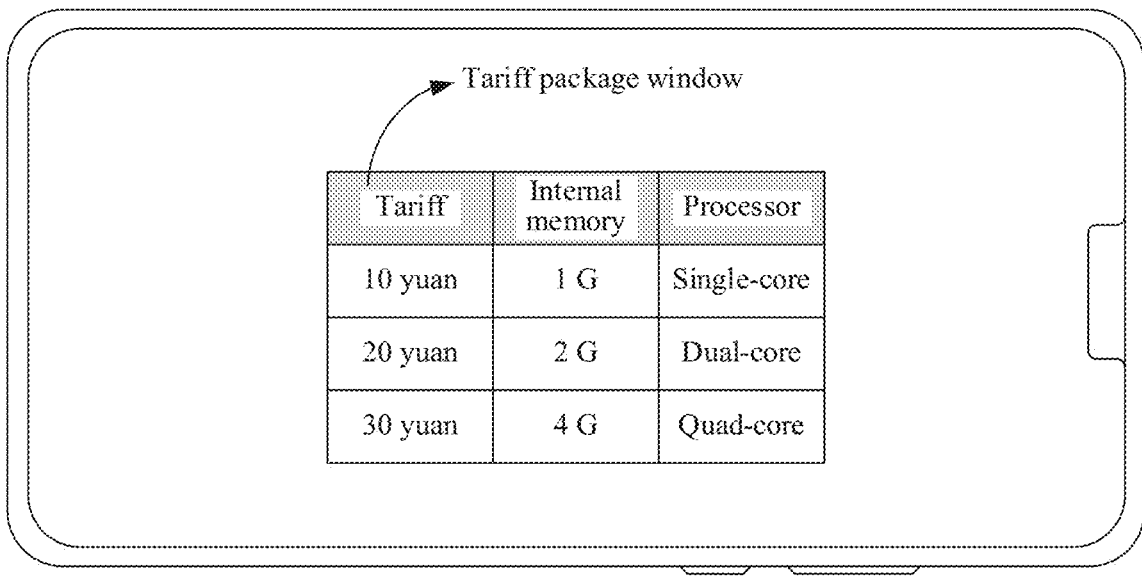
Figure 5D:

As shown in FIG. 5C, after receiving a tariff package display instruction entered by the user, the terminal device displays a tariff package window on a display screen. A tariff package selection window contains computing resources corresponding to different tariff packages. The user can select corresponding computing resources based on an expected cost. For example, if a user selects a 20-yuan tariff package, the user obtains computing resources of 2 G internal memory and dual-core processor during 3D model reconstruction.

In addition, to facilitate a user operation, a series of preset three-dimensional model reconstruction indicators may be displayed in the three-dimensional model reconstruction indicator configuration window. The user selects a three-dimensional model reconstruction indicator depending on needs, that is, input three-dimensional model reconstruction indicator selection information in the three-dimensional model reconstruction indicator configuration window, to complete indicator configuration. For example, in FIG. 5D, the user selects configuration information of "quality indicator, medium; object size, 10 cm to 50 cm; time consumed, 6 hours; internal memory, 1.6 G; processor, dual-core" by clicking a corresponding location in the window, and the terminal device sends the configuration information to the AR Cloud.

It should be noted that FIG. 5A to FIG. 5D are merely examples for description, and a person skilled in the art may correspondingly adjust configuration of the three-dimensional model reconstruction indicator information depending on actual needs. For example, in the performance indicator, in addition to a quantity of cores of the processor, a dominant frequency value of the processor may be further configured. Computing resources corresponding to different tariff packages may also be adjusted depending on actual needs.

Step S402: A server device determines an image acquisition solution based on the three-dimensional model reconstruction indicator information.

In this embodiment of this application, after receiving the three-dimensional model reconstruction indicator information, the server device determines an image acquisition solution that can meet a three-dimensional model reconstruction indicator requirement.

Photo acquisition is a very important step in the whole 3D model reconstruction process, and quality of a reconstruction result is often closely related to acquired photos. It can be understood that in order to achieve different quality indicators and/or object indicators, a quantity and quality of required photos vary. The image acquisition solution may include a quantity, an angle, a distance, a resolution, a lighting condition, a background requirement, and the like of photos. The following describes in detail.

Typically, each part of a reconstructed object should be photographed from a plurality of different view angles. In other words, photos taken around the reconstructed object should ensure a specific overlapping area, and different quality indicators and/or object indicators have different requirements on the overlapping area. Because the quantity and the angle of the photos affect a size of the overlapping area, different quality indicators and/or object indicators have different requirements on the quantity and a photographing angle of the photos.

Figure 6A:
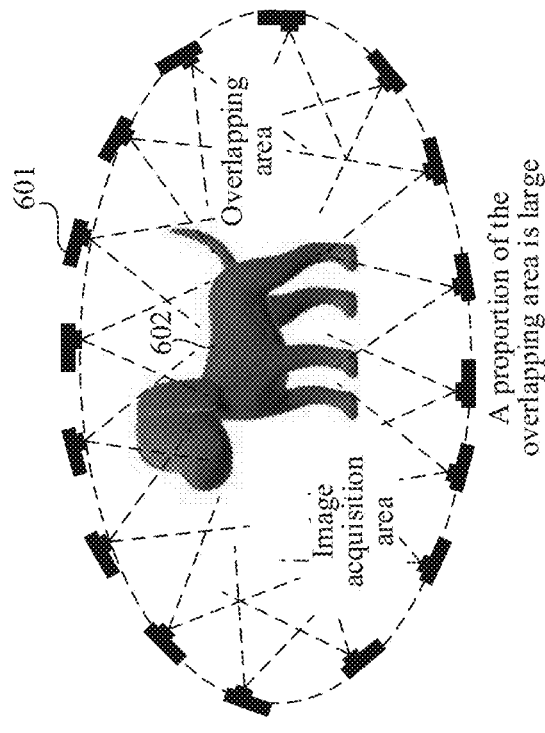
FIG. 6A to FIG. 6C are schematic diagrams of an image acquisition scenario according to an embodiment of this application.
Figure 6A:
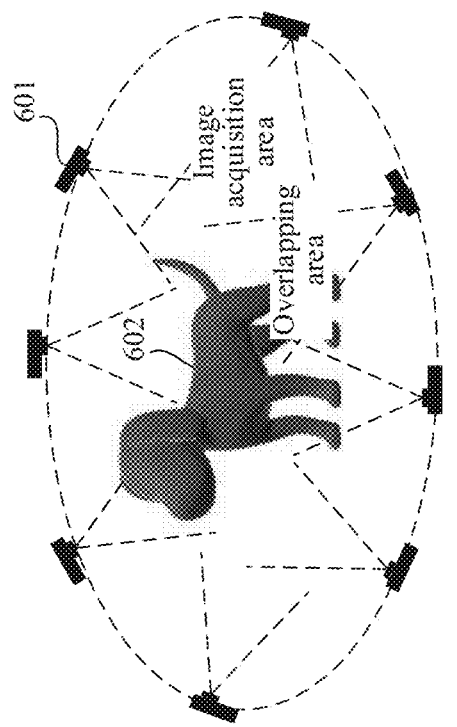
Figure 6B:
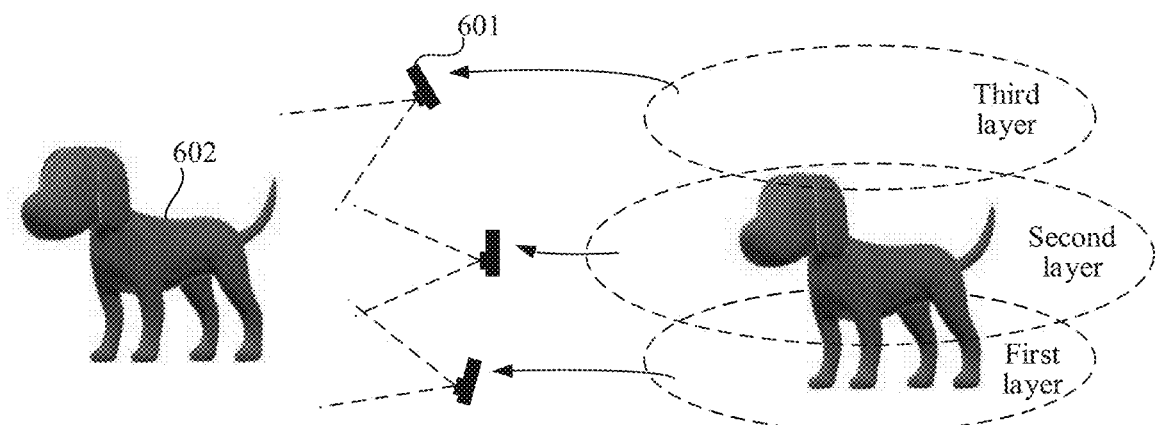
Figure 6C:
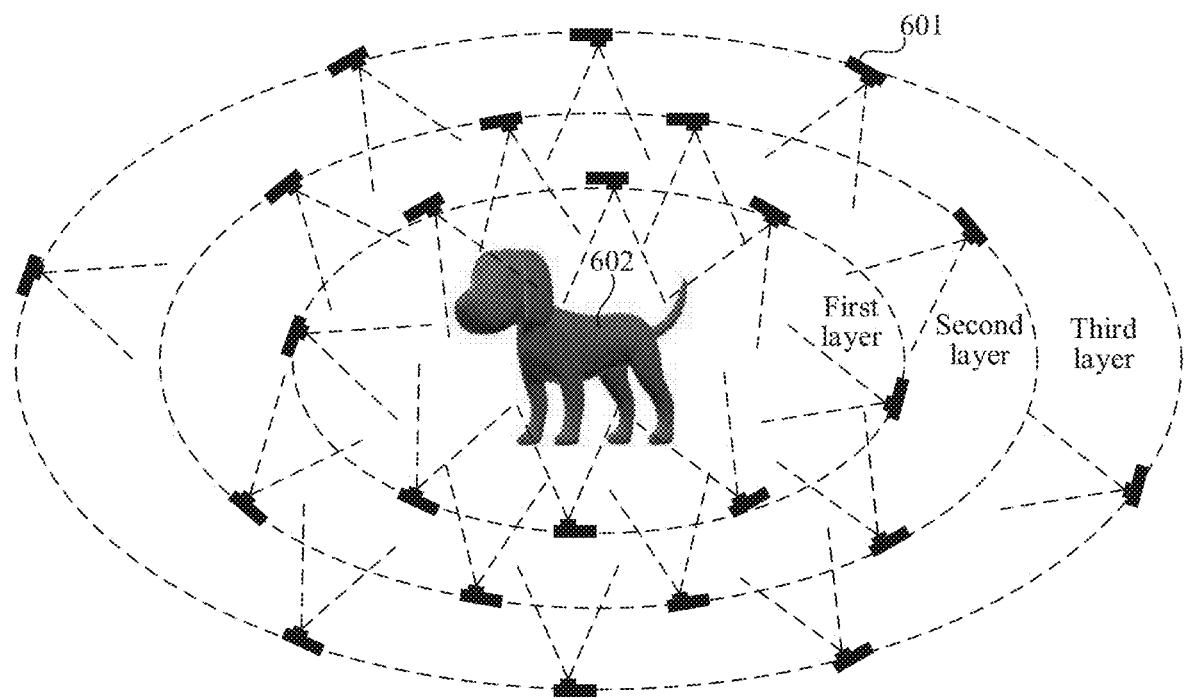

FIG. 6A to FIG. 6C are schematic diagrams of an image acquisition scenario according to an embodiment of this application. FIG. 6A shows an image acquisition device 601 and a reconstructed object 602. In an image acquisition scene on the left side of FIG. 6A, the image acquisition device 601 photographs around the reconstructed object 602 from eight view angles, and takes eight photos. At two adjacent photographing angles, overlapping image acquisition areas form an overlapping area. That is, there is an overlapping part in two photos acquired at the two adjacent photographing angles.

In an image acquisition scene on the right side of FIG. 6A, the image acquisition device 601 photographs around the reconstructed object 602 from 16 view angles, and takes 16 photos.

It may be understood that an overlapping area of photos acquired according to an image acquisition solution on the left side of FIG. 6A occupies a relatively small area. An overlapping area of photos acquired according to the image acquisition solution on the right side of FIG. 6A occupies a relatively large area. Therefore, when a quality indicator and/or an object indicator of 3D model reconstruction require a relatively high requirement, more photos should be taken, and angles among different photos should be properly controlled to obtain a relatively high proportion of overlapping areas.

It should be noted that, in addition to a relative angle between different photographing angles on a same horizontal plane, the angle in this embodiment of this application further includes photographing angles at different heights. Especially for a reconstructed object with a specific height, image acquisition needs to be carried out in different layers from different heights.

In FIG. 6B, the image acquisition device 601 performs image acquisition at three layers in a height direction: a first layer, a second layer, and a third layer. For a photographing angle and a photographing quantity of each layer, refer to descriptions in FIG. 6A. Details are not described herein again in this embodiment of this application.

In FIG. 6C, relative to the reconstructed object 602, the image acquisition device 601 performs image acquisition at three layers from far to near and from different distances: a first layer, a second layer, and a third layer. The method can restore texture information of a reconstructed photo to a maximum extent. Therefore, for a reconstructed object having high quality indicator requirements, the reconstructed object should be photographed from far to near and from different distances.

It may be understood quality of a reconstructed 3D model is directly related to resolution of acquired photos. Therefore, a higher quality indicator indicates a higher resolution of corresponding photos needing to be acquired. In a specific implementation, photos with different resolutions may be acquired by using cameras with different resolutions. For example, an image acquisition device includes a camera with a resolution of 500 M and a camera with a resolution of 1000 M. When a quality indicator is relatively high, the camera with a resolution of 1000 M is configured for image acquisition. When the quality indicator is relatively low, the camera with a resolution of 500 M is configured for image acquisition.

For lighting conditions, a stable ambient light source improves quality of acquired photos, as direct or changing lighting increases risk of overexposure or underexposure. When the quality indicator and/or object indicator of the 3D model reconstruction requires a relatively high requirement, that the lighting conditions are stable ambient light sources should be ensured.

For a background, backgrounds of different photos should be consistent and not be too messy to affect the 3D model reconstruction. It should be noted that, for a reconstructed object with a relatively single texture, a background pattern needs to be added in a photographing range, so that relative locations of photos taken from different angles are different.

In a specific implementation, after obtaining three-dimensional model reconstruction indicator information sent by a terminal device, a server device may perform estimation by using an algorithm, to generate an image acquisition solution. Specifically, the three-dimensional model reconstruction indicator information may be used as an input parameter of a preset algorithm model. After the three-dimensional model reconstruction indicator information is input into the algorithm model, an image acquisition solution is output. The algorithm model is not specifically limited in this embodiment of this application.

In another possible implementation, the image acquisition solution may be determined by searching a preset image acquisition solution comparison table.

Table 1 is an image acquisition solution comparison table according to an embodiment of this application. The image acquisition solution comparison table may be preconfigured based on experience, and includes a quality indicator, an object indicator, an image acquisition solution, and a correspondence among the quality indicator, the object indicator, and the image acquisition solution.

TABLE 1

| Quality indicators | Object indicators (sizes) | Image acquisition solution |
|---|---|---|
| High | Less than 10 cm | Camera location C |
| High | 10 cm to 50 cm | Camera location D |
| High | Greater than 50 cm | Camera location E |
| Medium | Less than 10 cm | Camera location B |
| Medium | 10 cm to 50 cm | Camera location C |
| Medium | Greater than 50 cm | Camera location D |
| Low | Less than 10 cm | Camera location A |
| Low | 10 cm to 50 cm | Camera location B |
| Low | Greater than 50 cm | Camera location C |

In Table 1, quality indicators are classified into three types based on intervals: high, medium, and low. For example, in quality indicator information sent by a terminal device, if IoU>98%, it indicates that the quality indicator is "high". If 95%≤IoU≤98%, the quality indicator is "medium". If 90%≤IoU≤95%, the quality indicator is "low".

In an embodiment of this application, a size of an object is described by using a size of a sphere corresponding to a 3D model, and is divided into three intervals based on a diameter of a corresponding sphere: less than 10 cm, 10 cm to 50 cm, and greater than 50 cm.

Based on different quality indicators and object indicators, a system predefines five camera locations A, B, C, D, and E. The camera locations are image acquisition solutions, and different camera locations represent different photographing requirements. For example:

The camera location A indicates that a camera with a resolution of 200 M is configured to photograph from four locations around a reconstructed object. Lighting intensity is 200 lumens or higher. Lumens are physical units for describing luminous flux.

The camera location B indicates that a camera with a resolution of 500 M is configured to photograph from four locations around the reconstructed object. The lighting intensity is 300 lumens or higher.

The camera location C indicates that a camera with a resolution of more than 1000 M is configured to photograph from four locations around the reconstructed object. The reconstructed object is required to occupy more than 60% of a picture and the lighting intensity is 500 lumens. A proportion of the reconstructed object in a photo picture may reflect a distance between an image acquisition device and the reconstructed object.

The camera location D indicates that the camera with a resolution of more than 1000 M is configured to photograph from 16 locations around the reconstructed object. An object is required to occupy more than 60% of a picture and the lighting intensity is 500 lumens.

The camera location E indicates that the camera with a resolution of more than 1000 M is configured to photograph from 24 locations around the reconstructed object. An object is required to occupy more than 60% of a picture and the lighting intensity is 500 lumens.

In addition, the AR Cloud can generate estimated performance information based on the quality indicator information and object indicator information. The estimated performance information is used for representing estimated to-be-consumed resources in a three-dimensional model reconstruction process, and the estimated to-be-consumed resources include an estimated to-be-consumed time resource and/or an estimated to-be-consumed computing resource For example, the computing resource may include internal memory and/or a processor resource. Certainly, the estimated performance information may also be preconfigured in an image acquisition solution comparison table. Estimated performance information corresponding to the quality indicator information and the object indicator information is determined by looking up the table, as shown in Table 2.

TABLE 2

| Quality indicators | Object indicators (sizes) | Image acquisition solution | Performance indicators (time-consuming) | Performance indicators (internal memory) |
|---|---|---|---|---|
| High | Less than 10 cm | Camera location C | 6 hours | 1.8 G |
| High | 10 cm to 50 cm | Camera location D | 7 hours | 2 G |
| High | Greater than 50 cm | Camera location E | 8 hours | 4 G |
| Medium | Less than 10 cm | Camera location B | 5.5 hours | 1.3 G |
| Medium | 10 cm to 50 cm | Camera location C | 6 hours | 1.6 G |
| Medium | Greater than 50 cm | Camera location D | 6.5 hours | 2 G |
| Low | Less than 10 cm | Camera location A | 5 hours | 1 G |
| Low | 10 cm to 50 cm | Camera location B | 5.5 hours | 1.2 G |
| Low | Greater than 50 cm | Camera location C | 6 hours | 1.5 G |

It should be noted that the performance indicator information in the three-dimensional model reconstruction indicator information is performance information expected by the user, and the estimated performance information generated by the AR Cloud is performance information estimated by the AR Cloud based on the quality indicator and the object indicator. When the three-dimensional model reconstruction indicator information sent by the terminal device includes the performance information expected by the user, the AR Cloud determines, by comparing the estimated performance information with the performance information expected by the user, whether the performance information expected by the user can meet a 3D model reconstruction requirement. If the performance information expected by the user can meet the 3D model reconstruction requirement, the computing resource is allocated based on the performance information expected by the user. If the 3D model reconstruction requirement cannot be met, the computing resource is allocated based on the estimated performance information. In an actual application scenario, when the performance information expected by the user cannot meet the 3D model reconstruction requirement, the AR Cloud may further send the estimated performance information of the AR Cloud to the terminal device for confirmation or selection by the user.

In addition, for a same quality indicator and an object indicator, more computing resources in the performance indicator indicate a shorter duration in a 3D model reconstruction process. When the user-expected performance indicator information includes only time resources, the AR Cloud can allocate corresponding computing resources based on the user-expected time resources. When the performance indicator information expected by the user includes only the computing resource, the AR Cloud may estimate a time resource, that is, estimate to-be-consumed duration, based on the computing resource expected by the user, and send estimated duration to the terminal device for reference by the user.

Step S403: The server device sends the image acquisition solution to the terminal device.

In this embodiment of this application, after generating the image acquisition solution, the server device sends the image acquisition solution to the terminal device, so that the terminal device performs image acquisition according to the image acquisition solution.

Step S404: The terminal device acquires a two-dimensional image of the reconstructed object according to the image acquisition solution.

In a specific implementation, the image acquisition solution may be specific image acquisition guide information, for example, text-type image acquisition guide information. The user takes a photo based on an instruction of the text-type image acquisition guide information. This process is a manual configuration process. For example, the user sets a background and a lighting condition based on a description of the image acquisition solution, and holds an image acquisition device to photograph around the reconstructed object to obtain the two-dimensional image of the reconstructed object.

In addition to the text-type image acquisition guide information, the image acquisition solution may further acquire guide information for an audio/video image, for example, a video tutorial. The video tutorial may guide a user to photograph in a graphic, text and sound manner.

To facilitate a user operation, the image acquisition solution may alternatively be a file readable by the terminal device. By reading the image acquisition solution, an image acquisition guide program is generated on the terminal device, and the user is guided to photograph by using the guide program, to improve convenience and accuracy of image acquisition. It may be understood that, when the guide program is used for guiding the user to photograph, the guide program further needs to perform lighting detection and background detection at the same time, to determine whether the lighting condition or the background meets a requirement of the image acquisition solution.

In an optional embodiment, the image acquisition guide program includes movement direction guidance information, and the movement direction guidance information is used for prompting to move to a target location, thereby improving friendliness of human-computer interaction. The following provides detailed description with reference to the accompanying drawings.

Figure 7A:
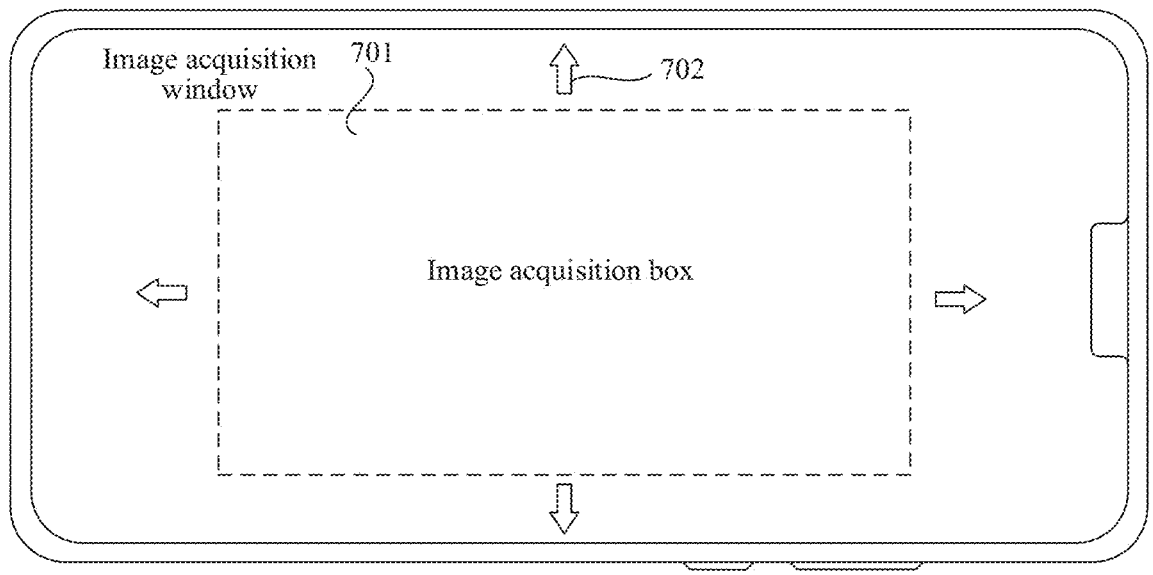
FIG. 7A to FIG. 7C are schematic diagrams of an image acquisition guide scenario according to an embodiment of this application.
Figure 7B:
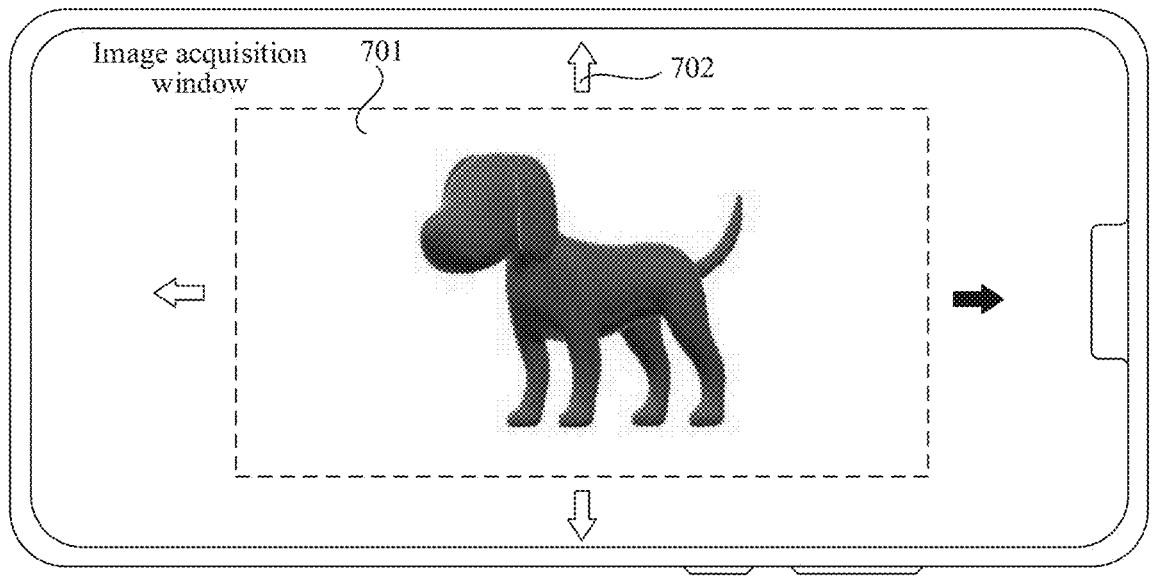
Figure 7C:
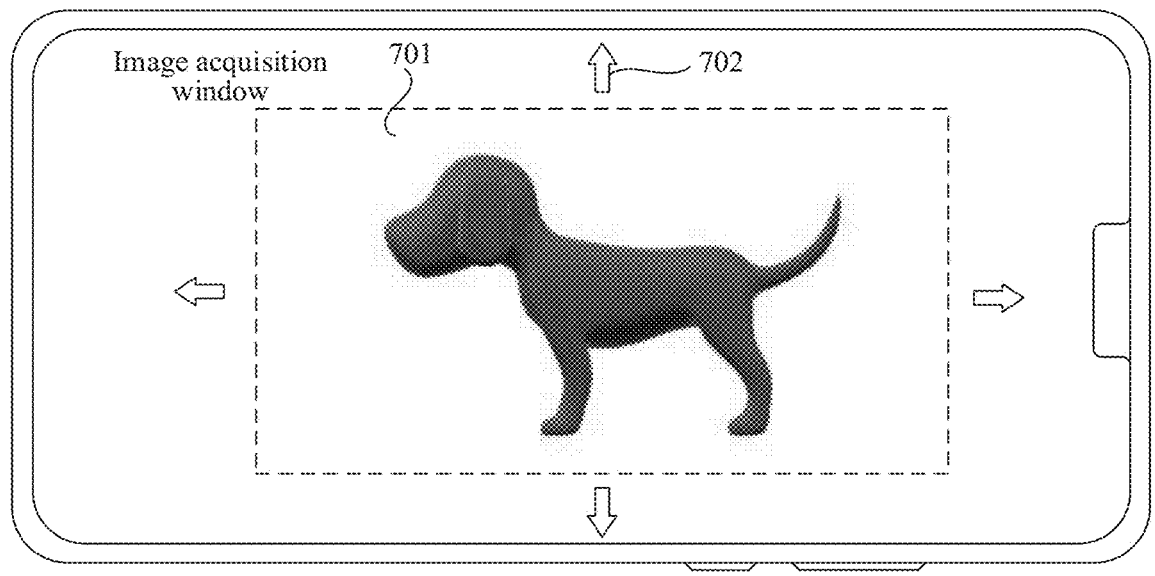

FIG. 7A to FIG. 7C are schematic diagrams of an image acquisition guide scenario according to an embodiment of this application. An image acquisition window is disposed in a display interface shown in FIG. 7A to FIG. 7C. The image acquisition window includes an image acquisition box (which is a dotted line box) 701 and a guide arrow 702, and the guide arrow 702 is the movement direction guidance information. During image acquisition, a reconstructed object remains immovable, and a terminal device photographs around the reconstructed object 360° from a plurality of different view angles. The image acquisition box 701 displays image information corresponding to a camera in real time, and guide arrows 702 around the image acquisition box 701 are used for guiding a movement direction of the terminal device.

For example, the terminal device needs to acquire eight photos around the reconstructed object 360°, and each photo is acquired at an average interval of 45°. The terminal device may take a photo from any angle, and take a second photo after turning 45° to the right from this location as a starting point. When the terminal device moves, a gyroscope sensor and an acceleration sensor in the terminal device may detect, in real time, a rotation angle and/or a movement distance of the terminal device, and then provide guidance by using the guide arrow 702 around the image acquisition box 701. For example, in FIG. 7B, after the terminal device acquires a first photo, an arrow on a right side of the image acquisition box 701 is highlighted, to guide a user to rotate the terminal device to the right. When the terminal device detects that the user rotates to a second image acquisition point, the arrow on the right side of the image acquisition box 701 returns to normal, and the terminal device captures a second photo at the location, as shown in FIG. 7C. By analogy, the terminal device acquires all photos.

In this embodiment of this application, the movement direction guidance information is used for guiding the user to move the terminal device to the target location, thereby facilitating a user operation and improving man-machine interaction friendliness.

It may be understood that the target location is a location in which two-dimensional image acquisition is not completed in an image acquisition solution, that is, the movement direction guidance information should guide the terminal device to move to a location in which image acquisition is not completed. When there are a plurality of locations in which the two-dimensional image acquisition is not completed, the terminal device may be guided to move to any location in which the image acquisition is not completed.

However, to improve acquisition efficiency of the two-dimensional image and avoid omission of the two-dimensional image, in an optional embodiment, the image acquisition guide program further includes an image acquisition sequence, and guides the user to complete the two-dimensional image acquisition based on the image acquisition sequence. Specifically, guidance information of a movement direction from a first acquisition location to a second acquisition location is output after a first two-dimensional image is acquired at the first acquisition location, where the guidance information of the movement direction from the first acquisition location to the second acquisition location is used for prompting to move to the second acquisition location. By using this solution, it is convenient for a user to sequentially complete acquisition of all two-dimensional images based on a preset image acquisition sequence, thereby improving acquisition efficiency of the two-dimensional images, and avoiding omission of the two-dimensional images. It should be noted that a specific form of the movement direction guidance information is not limited in this embodiment of this application. For example, in addition to the guide arrow in the foregoing embodiment, there may be voice guide information or other types of indication information in the display interface. For example, the image acquisition guide program includes a three-dimensional image acquisition scenario, and a location at which two-dimensional image acquisition needs to be performed is marked in the three-dimensional image acquisition scenario. It may be understood that the marked location is the target location. The user may determine a movement direction of the terminal device based on the marked location, and the marked location is the movement direction guidance information. The following describes in detail with reference to FIG. 8A to FIG. 8E. In FIG. 8A to FIG. 8E, a location at which two-dimensional image acquisition needs to be performed is marked by using an image acquisition positioning box.

FIG. 8A to FIG. 8E are schematic diagrams of another image acquisition guide scenario according to an embodiment of this application. An image acquisition box (which is a dotted line box) 801, an image acquisition positioning box (which is a solid line box) 802, and a guide arrow 803 are shown in FIG. 8A to FIG. 8E. During image acquisition, a reconstructed object remains immovable, and a terminal device photographs around the reconstructed object 360° from a plurality of different view angles. When the terminal device moves, a gyroscope sensor and an acceleration sensor in the terminal device may detect, in real time, an angle of rotation and/or a distance of movement of the terminal device, so that the image acquisition positioning box 802 rotates on a screen by a corresponding angle and/or moves by a corresponding distance. It should be noted that a movement direction of the image acquisition positioning box 802 in the display interface is opposite to a movement direction of the terminal device. For example, when the terminal device moves rightward, the image acquisition positioning box 802 moves leftward in the display interface. In this embodiment of this application, the guide arrow 803 is used for indicating the movement direction of the image acquisition positioning box 802 in the display interface. Certainly, the guide arrow 803 may not be included. This is not limited in this embodiment of this application.

In addition, when the terminal device moves, a location of the image acquisition box 801 on the screen remains unchanged. Therefore, a user may determine, through a relative location between the image acquisition box 801 and the image acquisition positioning box 802, the movement direction of the terminal device, and determine whether the terminal device moves to a corresponding location. When that the terminal device moves to the corresponding position is determined, the terminal device is controlled to photograph, to obtain a photo at a view angle of the image acquisition. A photographing action may be automatically triggered by the terminal device, or may be triggered by the user. This is not limited in this embodiment of this application.

Generally, a guide program includes a plurality of image acquisition positioning boxes 802, each image acquisition positioning box 802 represents a photographing view angle, and the guide program presets a location of each image acquisition positioning box 802 according to an image acquisition solution. For example, in the embodiment shown in FIG. 8A to FIG. 8E, eight photos need to be acquired evenly around the reconstructed object, that is, one photo is acquired every 45° around the reconstructed object. Correspondingly, the guide program includes eight image acquisition positioning boxes 802. The eight image acquisition positioning boxes 802 surround a circle, and image acquisition positioning boxes 802 are separated by 45°.

Figure 8A:
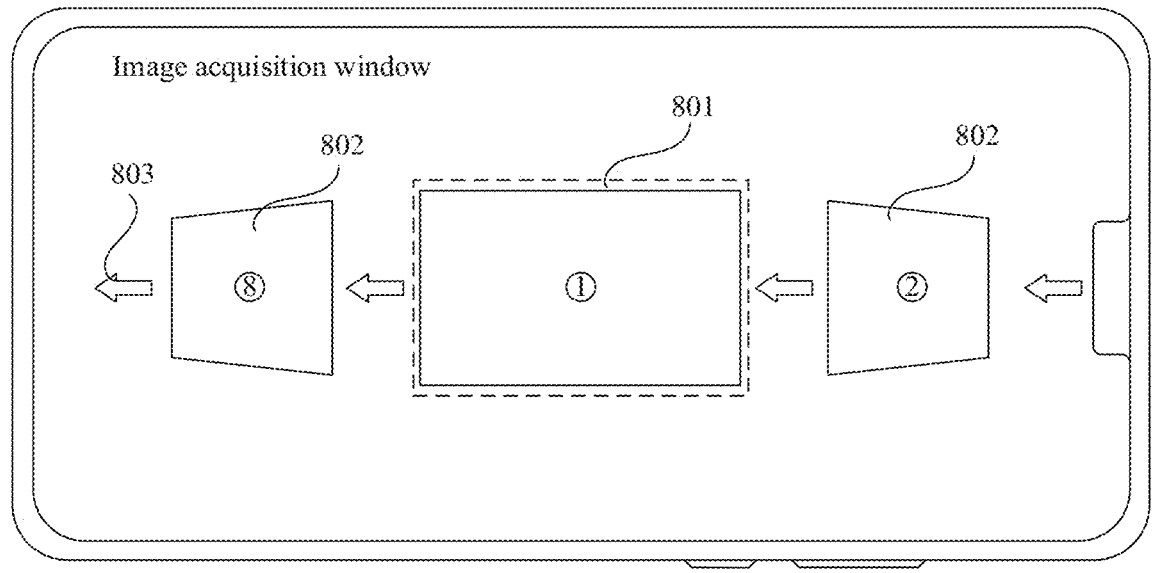
FIG. 8A to FIG. 8E are schematic diagrams of another image acquisition guide scenario according to an embodiment of this application.
Figure 8B:
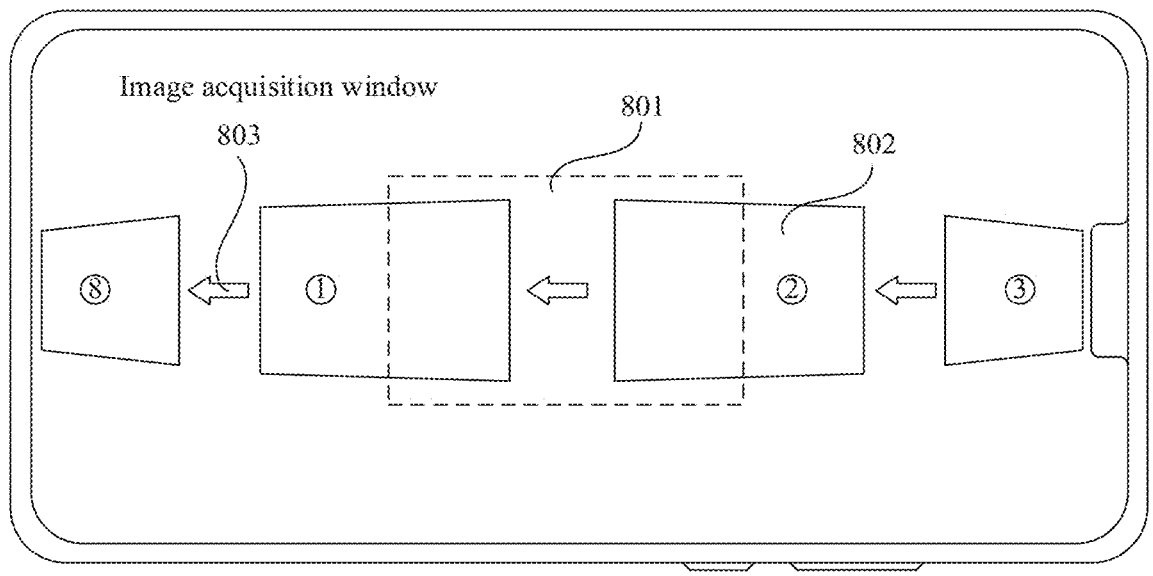
Figure 8C:
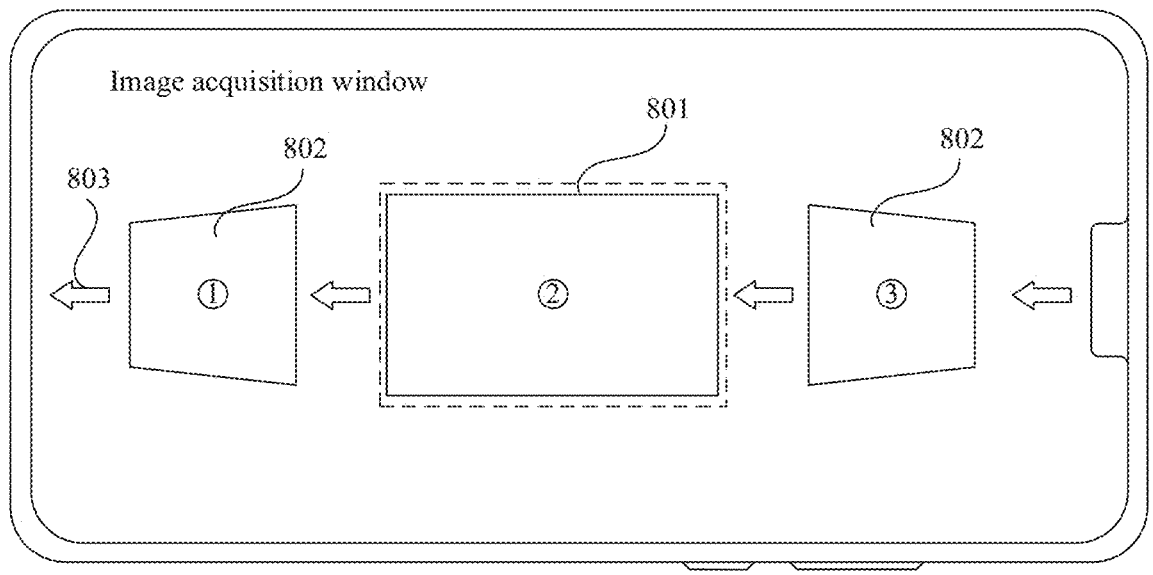

In an optional embodiment, to further improve friendliness of a human-computer interaction interface, a number is disposed on each image acquisition positioning box 802. For example. FIG. 8A shows an image acquisition positioning box ①, an image acquisition positioning box ②, and image acquisition positioning box ⑧. When the terminal device moves to a location shown in FIG. 8A, the image acquisition positioning box ① matches the image acquisition box 801, and in this case, the terminal device is triggered to acquire a first photo. After the first photo is acquired, the terminal device rotates to the right. Correspondingly, the image acquisition positioning box 802 rotates to the left on the screen (as shown by an arrow in FIG. 8B), and moves to a location shown in FIG. 8B. In this case, the image acquisition positioning box ② has not moved to a matching location of the image acquisition box 801. The terminal device continues to move rightward, and the image acquisition positioning box ② continues to move leftward on the screen to a location shown in FIG. 8C. In this case, the image acquisition positioning box ② matches the image acquisition box 801, and the terminal device is triggered to acquire a second photo. By analogy, the user completes acquisition of all photos based on an instruction of the image acquisition positioning box 802 in the guide program.

In addition, to improve friendliness of human-computer interaction, the terminal device may determine whether to move to a target location. When determining that the terminal device moves to the target location, the terminal device outputs the prompt information of reaching the target location, to prevent the user from triggering an image acquisition action of the terminal device when the user does not reach the target location or exceeds the target location, thereby affecting quality of an acquired two-dimensional image. The prompt information of the terminal device reaching the target location may be voice prompt information, indication information in a display interface, an indicator, or the like. This is not specifically limited in this embodiment of this application. In a specific implementation, the terminal device may detect, in real time by using a gyroscope sensor and an acceleration sensor, an angle of rotation and/or a distance of movement of the terminal device, to determine whether to move to the target location.

In an optional embodiment, to further improve friendliness of the human-computer interaction interface, a preview image of the acquired two-dimensional image may be displayed in the display interface in real time, so that the user learns of a two-dimensional image acquisition progress in real time. In addition, the user may further check based on the preview image, to avoid omission of the two-dimensional image.

Figure 8D:
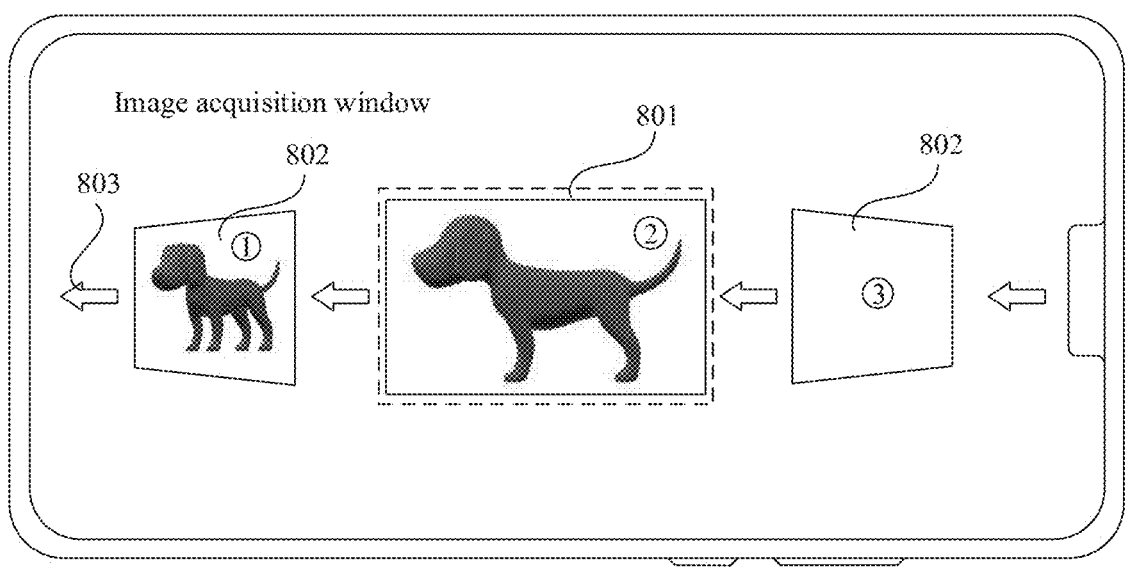

For example, in FIG. 8D, after photo acquisition at a location of the image acquisition positioning box ① is completed, a preview image of acquired photo is displayed at the location of the image acquisition positioning box ①. This manner may help the user learn about an image acquisition progress.

Figure 8E:
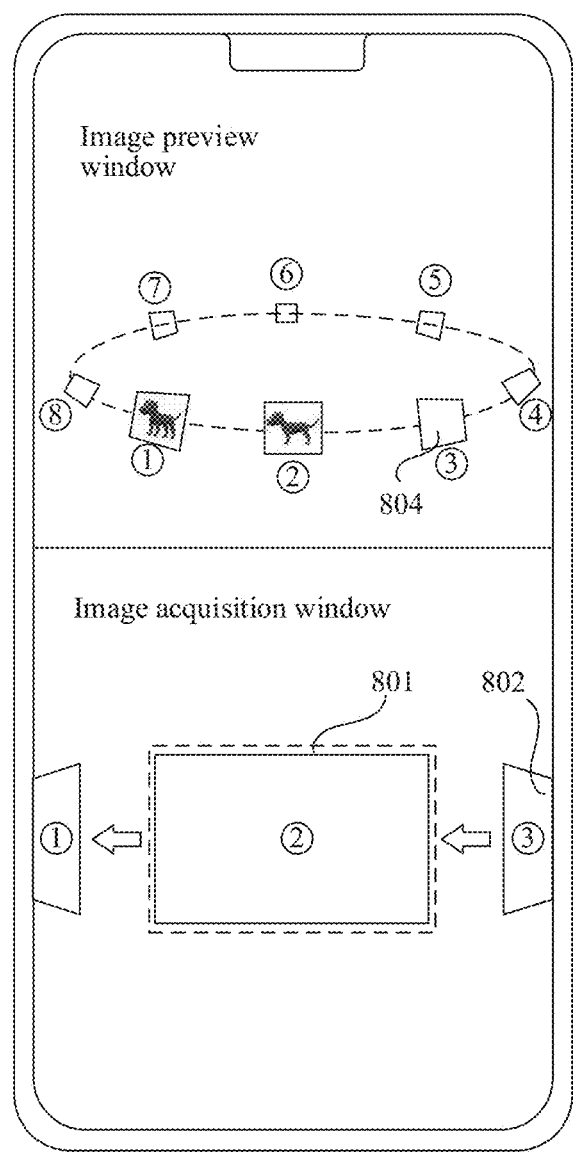

In an optional embodiment, to further improve friendliness of the human-computer interaction interface, a display screen of the terminal device is divided into an image preview window and an image acquisition window, as shown in FIG. 8E. For ease of description, a positioning box in the image preview window is referred to as an image preview positioning box 804. A schematic diagram of an entire image acquisition solution is displayed in the image preview window, including a quantity of the image preview positioning box 804 and a location of the image preview positioning box 804. In addition, a current image acquisition progress may further be displayed in the image preview window. Specifically, a preview image of the acquired photo is displayed at the location of the image preview positioning box 804 for completing acquisition. As shown in FIG. 8E, after the photo acquisition at locations of the image acquisition positioning box ① and the image acquisition positioning box ② is completed, a preview image of the acquired photo is displayed at locations of the image preview positioning box ① and the image preview positioning box ② in the image preview window. It should be noted that a fixed picture may be displayed in the image preview window (the image preview positioning box 804 in the image preview window does not move or rotate correspondingly with movement or rotation of the terminal device). A motion picture may also be displayed in the image preview window (the image preview positioning box 804 in the image preview window moves or rotates correspondingly with the movement or rotation of the terminal device). This is not limited in this embodiment of this application. In addition, an image acquisition manner in the image acquisition window is similar to an image acquisition manner described in the embodiment shown in FIG. 8A to FIG. 8D, and details are not described herein again.

In the foregoing embodiment, image acquisition guide program guides the user to manually complete acquisition of the two-dimensional image. In an optional embodiment, a mechanical arm is controlled through the image acquisition guide program to drive the terminal device to move to a target location, to acquire a two-dimensional image of the reconstructed object. More accurate control can be performed on the acquisition of the two-dimensional image through the mechanical arm, and precision of the acquisition of the two-dimensional image is higher.

Figure 9:
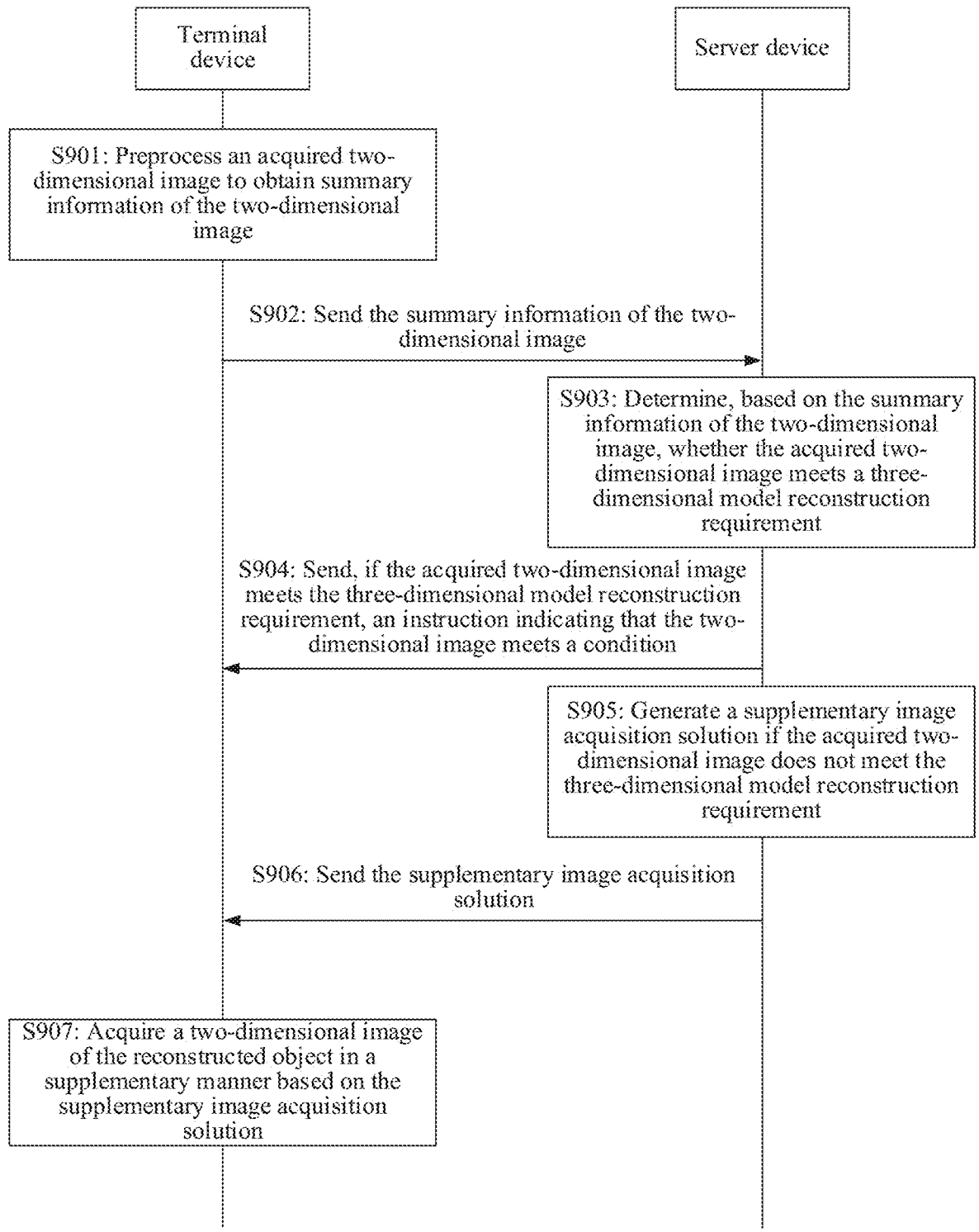
FIG. 9 is a schematic flowchart of a three-dimensional model reconstruction method according to an embodiment of this application.

In this embodiment of this application, by adding a reconstruction communication link in a 3D model reconstruction process for communication about a 3D model reconstruction requirement and an image acquisition solution, a problem of a 3D model reconstruction failure caused by that an acquired two-dimensional image does not meet the 3D model reconstruction requirement is avoided, thereby improving a one-time reconstruction success rate. FIG. 9 is a schematic flowchart of another three-dimensional model reconstruction method according to an embodiment of this application. As shown in FIG. 9, after step S404 in the embodiment shown in FIG. 4, the method further includes the following steps.

Step S901: A terminal device preprocesses an acquired two-dimensional image to obtain summary information of the two-dimensional image.

In this embodiment of this application, after completing photo acquisition, the terminal device preprocesses an acquired photo to generate summary information of the acquired photo. The summary information is used for determining whether the acquired photo meets a photo requirement in an image acquisition solution, that is, whether a three-dimensional model reconstruction requirement is met. Specifically, the summary information includes a quantity of photos, an acquisition angle of each photo, a low-resolution version of the photo, and the like.

Step S902: The terminal device sends the summary information of the two-dimensional image to a server device.

After obtaining the summary information of the two-dimensional image, the terminal device sends the summary information to the server device, so that the server device determines, based on the summary information, whether a photo acquired by the terminal device can meet the 3D model reconstruction requirement.

Step S903: The server device determines, based on the summary information of the two-dimensional image, whether an acquired two-dimensional image set meets the three-dimensional model reconstruction requirement.

Specifically, the server device may determine, based on the summary information, a quantity of photos acquired by the terminal device and whether quality of each photo meets a requirement. Photo quality evaluation indicators include resolution, illumination, saturation, a definition, a proportion of a reconstructed object in the photo, a photographing angle, a background color, and the like.

Step S904: Send, if the acquired two-dimensional image meets the three-dimensional model reconstruction requirement, an instruction indicating that the two-dimensional image meets a condition to the terminal device.

In this embodiment of this application, if the server device determines that the two-dimensional image acquired by the terminal device meets the three-dimensional model reconstruction requirement, it is indicated that three-dimensional model reconstruction that meets a quality indicator and an object indicator requirement can be completed within a corresponding time, and the instruction indicating that the two-dimensional image meets a condition is sent to the terminal device.

After receiving the instruction indicating that the two-dimensional image meets a condition, the server device sends the acquired two-dimensional image to the server device, so that the server device performs a 3D model reconstruction operation.

Step S905: Generate a supplementary image acquisition solution if the acquired two-dimensional image does not meet the three-dimensional model reconstruction requirement.

In this embodiment of this application, if the server device determines that the two-dimensional image acquired by the terminal device does not meet the three-dimensional model reconstruction requirement, it is indicated that the three-dimensional model reconstruction that meets the quality indicator and the object indicator requirement cannot be completed within a corresponding time by using the acquired two-dimensional image, and the server device generates the supplementary image acquisition solution based on the summary information.

For example, in the image acquisition solution, the terminal device is required to acquire eight photos, but the server device determines, based on the summary information, that the terminal device acquires only seven photos. Therefore, that a quantity of photos acquired by the terminal device does not meet the requirement may be determined, and the photos need to be acquired in a supplementary manner.

Step S906: The server device sends the supplementary image acquisition solution to the terminal device.

After generating the supplementary image acquisition solution, the server device sends the supplementary image acquisition solution to the terminal device, so that the terminal device acquires the two-dimensional image in a supplementary manner based on the supplementary image acquisition solution.

In a specific implementation, the supplementary image acquisition solution may be a supplementary image acquisition guide program, supplementary text image acquisition guide information, and/or supplementary audio and video image acquisition guide information, for example, a photographing tutorial, where the photographing tutorial may guide a user to photograph in a manner of graphic, text and sound.

In a possible implementation, the supplementary image acquisition solution includes defect prompt information, and the defect prompt information is used for prompting the user of a reason why a defect exists, so that the user acquires the two-dimensional image in a supplementary manner.

Figure 10:
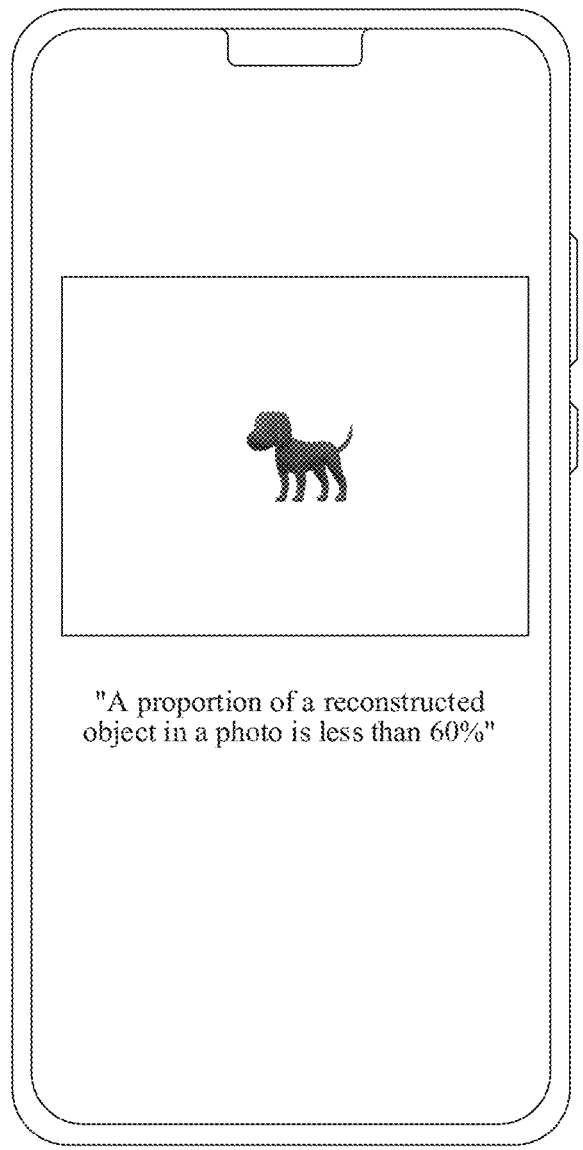
FIG. 10 is a schematic diagram of a supplementary image acquisition solution according to an embodiment of this application.

FIG. 10 is a schematic diagram of a supplementary image acquisition solution according to an embodiment of this application. In the embodiment shown in FIG. 10, an image acquisition solution requires that a proportion of a reconstructed object in acquired photos should be greater than 60%. However, there is a two-dimensional image of which "a proportion of a reconstructed object is less than 60%" in two-dimensional images acquired by a user. Therefore, it is determined that the two-dimensional image does not meet a requirement, and the supplementary image acquisition solution is generated. A server device sends the supplementary image acquisition solution to a terminal device. The supplementary image acquisition solution includes a two-dimensional image not meeting a requirement, and a reason "a proportion of a reconstructed object in a photo is less than 60%" why the two-dimensional image does not meet the requirement, as shown in FIG. 10. The user can easily determine, based on the foregoing information, a two-dimensional image that needs to be acquired in a supplementary manner, and precautions for supplementary acquisition of the two-dimensional image, to ensure that a two-dimensional image acquired in a supplementary manner meets a supplementary image acquisition solution requirement.

Figure 11:
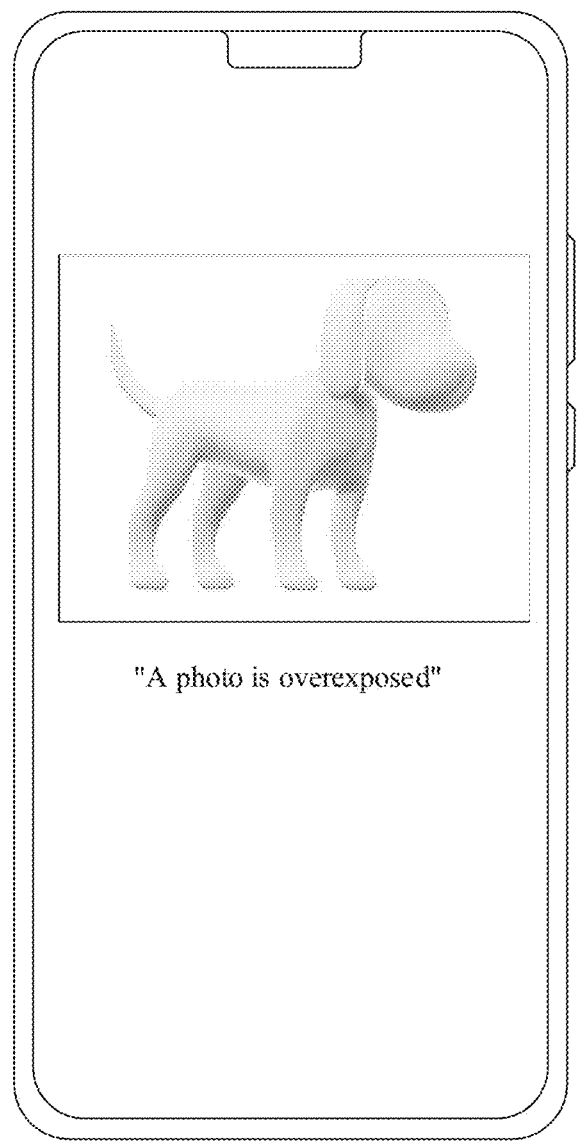
FIG. 11 is a schematic diagram of another supplementary image acquisition solution according to an embodiment of this application.

FIG. 11 is a schematic diagram of another supplementary image acquisition solution according to an embodiment of this application. FIG. 11 shows a two-dimensional image. The two-dimensional image is overexposed and does not meet a 3D model reconstruction requirement, and a supplementary image acquisition solution is generated. A server device sends the supplementary image acquisition solution to a terminal device. The supplementary image acquisition solution includes a two-dimensional image not meeting a requirement, and a reason "a photo is overexposed" why the two-dimensional image does not meet the requirement. A user may easily determine, based on the foregoing information, a two-dimensional image that needs to be acquired in a supplementary manner, and precautions for supplementary acquisition of the two-dimensional image, for example, reducing lighting intensity in a photographing environment, or reducing exposure by adjusting an aperture of a camera, to ensure that a two-dimensional image acquired in a supplementary manner meets a supplementary image acquisition solution requirement.

It should be noted that a two-dimensional image acquired by the terminal device may further have other defects, for example, a resolution is too low, and a photo background does not meet a requirement, which are not listed one by one herein.

Step S907: The terminal device acquires a two-dimensional image of the reconstructed object in a supplementary manner based on the supplementary image acquisition solution.

After receiving the supplementary image acquisition solution, the terminal device acquires the two-dimensional image of the reconstructed object in a supplementary manner based on the supplementary image acquisition solution. The terminal device sends an acquired two-dimensional image to the server device after completing supplementary image acquisition. It should be noted that the acquired two-dimensional images in this case include a two-dimensional image initially acquired by the terminal device according to the image acquisition solution and a two-dimensional image acquired in a supplementary manner according to the image acquisition solution.

In a possible embodiment, after acquiring the two-dimensional image of the reconstructed object in a supplementary manner, the terminal device may further send summary information of supplemented and acquired two-dimensional image to the server device, and the server device determines whether the two-dimensional image acquired in a supplementary manner meets a requirement.

In this embodiment of this application, after the two-dimensional image is acquired according to the image acquisition solution, the terminal device and the server device further communicate with each other about a quantity and quality of the acquired two-dimensional images, so that a one-time reconstruction success rate can be further improved.

It may be understood that, after acquiring the two-dimensional image by using the foregoing method, the terminal device needs to send the acquired two-dimensional image to the server device, and the server device performs 3D model reconstruction based on the two-dimensional image. The method specifically includes the following steps. Step S1201: The terminal device sends the acquired two-dimensional image to the server device.

After completing image acquisition, the terminal device sends the acquired two-dimensional image to the server device, so that the server device performs a 3D model reconstruction operation based on the two-dimensional image.

It should be noted that if step S1201 is performed after step S907 shown in FIG. 9, two-dimensional images sent by the terminal device to the server device include a two-dimensional image initially acquired by the terminal device according to the image acquisition solution and a two-dimensional image acquired in a supplementary manner based on the supplementary image acquisition solution.

Step S1202: The server device performs the three-dimensional model reconstruction operation based on the two-dimensional image to generate a three-dimensional model.

After receiving the two-dimensional images sent by the terminal device, the server device performs the 3D model reconstruction operation on the two-dimensional images to generate the 3D model. In an optional embodiment, the 3D model reconstruction operation may be photogrammetry pipeline calculation. Certainly, a 3D model reconstruction tool is not limited in this embodiment of this application. A person skilled in the art may complete 3D model reconstruction based on another tool.

In addition, in a process in which the server device performs the 3D model reconstruction, 3D model reconstruction progress may be sent to the terminal device based on a preset time interval, so that the user learns the 3D model reconstruction progress in real time.

Step S1203: The server device sends the three-dimensional model to the terminal device.

After the 3D model reconstruction is completed, the server device sends the 3D model to the terminal device. In this case, the 3D model reconstruction is completed. The 3D model may be a 3D model-specific format file such as obj. The file may be used in 3D printing, animation, teaching, product design, and another process.

In a specific implementation, an embodiment of this application further provides a terminal device. The terminal device includes one or more cameras, a processor, a memory, and one or more computer programs. The one or more computer programs are stored in the memory, and the one or more computer programs include instructions. When the instructions are executed by the terminal device, the terminal device is enabled to perform some or all of the steps in the foregoing method embodiments.

In a specific implementation, an embodiment of this application further provides a server device. The server device includes one or more processors, a memory, and one or more computer programs. The one or more computer programs are stored in the memory, and the one or more computer programs include instructions. When the instructions are executed by the terminal device, the terminal device is enabled to perform some or all of the steps in the foregoing method embodiments.

In a specific implementation, this application further provides a computer storage medium. The computer storage medium may store a program. When the program is executed, some or all of the steps in the embodiments provided in this application may be performed. The storage medium may be a magnetic disk, an optical disc, or a read-only memory (English: read-only memory, ROM for short), random access memory (English: random access memory, RAM for short), or the like.

In a specific implementation, an embodiment of this application further provides a computer program product. The computer program product includes an executable instruction. When the executable instruction is executed on a computer, the computer is enabled to perform some or all of the steps in the foregoing method embodiments.

In embodiments of this application, "at least one" means one or more, and "a plurality of" means two or more. "and/or" describes an association relationship between associated objects, and indicates that three relationships may exist. For example, A and/or B may represent the following three cases: Only A exists, both A and B exist, and only B exists. A and B may be singular or plural. The character "/" in this specification generally indicates an "or" relationship between the associated objects. "At least one of the following" and similar expressions refer to any combination of these terms, including any combination of single or plural terms. For example, at least one of a, b, and c may represent: a, b, c, a-b, a-c, b-c, or a-b-c, where a, b, and c may be one or more.

A person of ordinary skill in the art may be aware that the units and algorithm steps described in the embodiments disclosed in this specification can be implemented by a combination of electronic hardware, computer software, and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of the present invention.

It may be clearly understood by a person skilled in the art that, for convenient and brief description, for a detailed working process of the foregoing system, apparatus, and units, refer to a corresponding process in the foregoing method embodiments, and details are not described herein again.

In several embodiments provided in the present invention, if any function is implemented in a form of a software functional unit and sold or used as an independent product, any function may be stored in a computer-readable storage medium. Based on such an understanding, the technical solutions of the present invention essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (read-only memory, ROM for short), a random access memory (random access memory, RAM for short), a magnetic disk, or an optical disc.

The foregoing descriptions are merely specific implementations of the present invention. Any variation or replacement readily figured out by a person skilled in the art within the technical scope disclosed in the present invention shall fall within the protection scope of the present invention. The protection scope of the present invention shall be subject to the protection scope of the claims.

What is claimed is:

1. A method, applied to a terminal device, wherein the method comprises:
   sending three-dimensional model reconstruction indicator information, wherein the three-dimensional model reconstruction indicator information comprises object indicator information representing a size of a to-be-reconstructed three-dimensional model, and wherein the three-dimensional model reconstruction indicator information represents a three-dimensional model reconstruction requirement;
   receiving, in response to the three-dimensional model reconstruction requirement, an image acquisition solution, wherein the image acquisition solution guides acquisition of a two-dimensional image of a reconstructed object;
   acquiring, based on the image acquisition solution, the two-dimensional image of the reconstructed object; and
   reconstructing, based on the two-dimensional image, a three-dimensional model.

2. The method of claim 1, wherein the image acquisition solution comprises an image acquisition guide program, and wherein acquiring the two-dimensional image of the reconstructed object comprises acquiring, based on the image acquisition guide program, the two-dimensional image of the reconstructed object.

3. The method of claim 2, wherein acquiring the two-dimensional image of the reconstructed object based on the image acquisition guide program comprises:
   outputting movement direction guidance information prompting to move to a target location; and
   acquiring the two-dimensional image of the reconstructed object in response to an image acquisition instruction input.

4. The method of claim 3, wherein the image acquisition guide program comprises an image acquisition sequence, and wherein outputting movement direction guidance information comprises, outputting, based on the image acquisition sequence, guidance information of a movement direction from a first acquisition location to a second acquisition location after acquisition for a first two-dimensional image at the first acquisition location is completed, and wherein the guidance information prompts to move to the second acquisition location.

5. The method of claim 3, further comprising outputting information indicating reaching the target location when the terminal device moves to the target location.

6. The method of claim 2, wherein acquiring the two-dimensional image of the reconstructed object further comprises:
   controlling, by the image acquisition guide program, a mechanical arm to drive the terminal device to move to a target location; and
   acquiring, after the controlling, the two-dimensional image of the reconstructed object.

7. The method of claim 1, further comprising displaying a preview image of the two-dimensional image.

8. The method of claim 1, further comprising:
- preprocessing the two-dimensional image to obtain summary information of the two-dimensional image;
- sending the summary information to a server device, wherein the summary information is configured for determining whether the two-dimensional image meets the three-dimensional model reconstruction requirement; and
- acquiring, in response to a supplementary image acquisition solution from the server device, the two-dimensional image of the reconstructed object in a supplementary manner based on the supplementary image acquisition solution, or receiving an instruction from the server device, wherein the instruction indicates that the two-dimensional image is capable of meeting the three-dimensional model reconstruction requirement.

9. The method of claim 8, wherein the supplementary image acquisition solution comprises defect prompt information comprising an indication of a cause of a defect.

10. The method of claim 1, wherein sending three-dimensional model reconstruction indicator information comprises:
- sending the three-dimensional model reconstruction indicator information in response to three-dimensional model reconstruction indicator input information; or
- sending three-dimensional model reconstruction indicator selection information input by a user, wherein the three-dimensional model reconstruction indicator information corresponds to the three-dimensional model reconstruction indicator input information or the three-dimensional model reconstruction indicator selection information.

11. The method of claim 1, wherein the three-dimensional model reconstruction indicator information further comprises quality indicator information representing a quality of the to-be-reconstructed three-dimensional model and performance indicator information representing at least one of a time resource or a computing resource expected to be consumed.

12. A terminal device, comprising:
- a memory configured to store one or more computer programs; and
- one or more processors coupled to the memory and configured to execute the one or more computer programs to cause the terminal device to:
  - send three-dimensional model reconstruction indicator information, wherein the three-dimensional model reconstruction indicator information comprises object indicator information representing a size of a to-be-reconstructed three-dimensional model, and wherein the three-dimensional model reconstruction indicator information represents a three-dimensional model reconstruction requirement;
  - receive an image acquisition solution, wherein the image acquisition solution guides acquisition of a two-dimensional image of a reconstructed object;
  - acquire, based on the image acquisition solution, the two-dimensional image of the reconstructed object; and
  - reconstruct, based on the two-dimensional image, a three-dimensional model.

13. The terminal device of claim 12, wherein the image acquisition solution comprises an image acquisition guide program, and wherein acquiring the two-dimensional image of the reconstructed object further comprises, acquiring, based on the image acquisition guide program, the two-dimensional image of the reconstructed object.

14. The terminal device of claim 13, wherein acquiring the two-dimensional image of the reconstructed object based on the image acquisition guide program comprises:
- outputting movement direction guidance information prompting to move to a target location; and
- acquiring the two-dimensional image of the reconstructed object in response to an image acquisition instruction input.

15. The terminal device of claim 14, wherein the image acquisition guide program comprises an image acquisition sequence, and wherein outputting movement direction guidance information comprises outputting, based on the image acquisition sequence, guidance information of a movement direction from a first acquisition location to a second acquisition location after acquisition for a first two-dimensional image at the first acquisition location is completed, wherein the guidance information prompts to move to the second acquisition location.

16. The terminal device of claim 14, wherein the one or more computer programs, when executed, further controls the terminal device to output information indicating reaching the target location when the terminal device moves to the target location.

17. The terminal device of claim 13, wherein acquiring the two-dimensional image of the reconstructed object further comprises:
- controlling, by the image acquisition guide program, a mechanical arm to drive the terminal device to move to a target location; and
- acquiring, after the controlling, the two-dimensional image of the reconstructed object.

18. The terminal device of claim 12, wherein the one or more computer programs, when executed, further controls the terminal device to display a preview image of the two-dimensional image.

19. The terminal device of claim 12, wherein the one or more computer programs, when executed, further controls the terminal device to:
- preprocess the two-dimensional image to obtain summary information of the two-dimensional image;
- send the summary information to a server device, wherein the summary information is configured for determining whether the two-dimensional image meets the three-dimensional model reconstruction requirement; and
- acquire, in response to a supplementary image acquisition solution received from the server device, the two-dimensional image of the reconstructed object in a supplementary manner based on the supplementary image acquisition solution, or receive an instruction from the server device, wherein the instruction indicates that the two-dimensional image is capable of meeting the three-dimensional model reconstruction requirement.

20. A non-transitory computer-readable storage medium comprising a stored program that, when executed, controls a terminal device to:
- send three-dimensional model reconstruction indicator information, wherein the three-dimensional model reconstruction indicator information comprises object indicator information representing a size of a to-be-reconstructed three-dimensional model, and wherein the three-dimensional model reconstruction indicator information represents a three-dimensional model reconstruction requirement;
- receive an image acquisition solution, wherein the image acquisition solution guides acquisition of a two-dimensional image of a reconstructed object;

acquire, based on the image acquisition solution, the two-dimensional image of the reconstructed object; and reconstruct, based on the two-dimensional image, a three-dimensional model.

* * * * *